US012247718B2

(12) United States Patent
Garrett et al.

(10) Patent No.: US 12,247,718 B2
(45) Date of Patent: Mar. 11, 2025

(54) ELONGATED HEXAGONAL DECORATIVE LIGHT SYSTEM

(71) Applicant: Jem Accessories, Inc., Edison, NJ (US)

(72) Inventors: Jennifer Garrett, Rahway, NJ (US); Elie Chemtob, Eatontown, NJ (US); Charles LaVene, Linden, NJ (US)

(73) Assignee: Jem Accessories, Inc., Edison, NJ (US)

( * ) Notice: Subject to any disclaimer, the term of this patent is extended or adjusted under 35 U.S.C. 154(b) by 0 days.

(21) Appl. No.: 17/992,383

(22) Filed: Nov. 22, 2022

(65) Prior Publication Data

US 2023/0080087 A1 Mar. 16, 2023

Related U.S. Application Data

(63) Continuation of application No. PCT/US2021/035319, filed on Jun. 1, 2021.

(Continued)

(51) Int. Cl.

| | |
|---|---|
| ***F21S 8/00*** | (2006.01) |
| ***F21S 2/00*** | (2016.01) |
| ***F21V 23/00*** | (2015.01) |
| ***F21V 23/06*** | (2006.01) |
| *F21Y 115/10* | (2016.01) |

(52) U.S. Cl.

CPC ............... *F21S 8/035* (2013.01); *F21S 2/005* (2013.01); *F21V 23/005* (2013.01); *F21V 23/06* (2013.01); *F21Y 2115/10* (2016.08)

(58) Field of Classification Search

CPC ........ F21V 23/06; F21V 23/005; F21S 2/005; F21S 8/035

See application file for complete search history.

(56) References Cited

U.S. PATENT DOCUMENTS 8,299,719 B1 * 10/2012 Moshirnoroozi .... H05B 47/165 315/318

2002/0113246 A1 * 8/2002 Nagai ................ H01R 13/7175 438/22

(Continued)

FOREIGN PATENT DOCUMENTS

WO WO-2021247533 A1 * 12/2021 ............ F21V 23/005

OTHER PUBLICATIONS

Innovation Q+ (Year: 2023).*

*Primary Examiner* — Anabel Ton

(74) *Attorney, Agent, or Firm* — Goldberg Cohen LLP

(57) ABSTRACT

An elongated hexagonal decorative light system comprises a plurality of light panel assemblies, each light panel assembly having an elongate hexagonal shaped base defining two electrical receptacles at each end of the elongate base. A printed circuit assembly is mounted to the base and has a plurality of light emitting diodes populated thereon with electronic circuitry for selectively illuminating the light emitting diodes, and a prismatically shaped lens affixed to the base. A controller has a printed circuit assembly mounted wherein the printed circuit assembly includes the circuitry and logic for controlling the plurality of light panels. The controller includes a signal cord extending therefrom and terminating with an electrical connector receivable in the light panel receptacles. A plurality of connector cables, each having a multi-lead cable segment terminated at each end with an electrical plug receivable in the electrical receptacles in the light panel assemblies.

20 Claims, 29 Drawing Sheets

Related U.S. Application Data

(60) Provisional application No. 63/033,112, filed on Jun. 1, 2020.

(56) References Cited

U.S. PATENT DOCUMENTS

| | | | | |
|---|---|---|---|---|
| 2009/0073692 | A1 * | 3/2009 | Berger | A47B 97/00 362/249.02 |
| 2023/0085582 | A1 * | 3/2023 | Garrett | F21V 21/005 362/249.02 |

* cited by examiner

ELONGATED HEXAGONAL DECORATIVE LIGHT SYSTEM

CROSS-REFERENCE TO RELATED APPLICATION

This Non-Provisional Utility application is a continuation of PCT/US21/35319 filed on Jun. 1, 2021 (pending), which claims the benefit of U.S. Provisional Patent Application Ser. No. 63/033,112, filed on Jun. 1, 2020, which are incorporated herein in their entirety.

FIELD OF THE INVENTION

A series of electro illuminating components designed to be electrically interconnected one with another and placed upon a surface in any of aim variety of desired patterns.

BACKGROUND OF THE INVENTION

Lighting has always been a necessity of everyday life. Throughout history, mankind has desired to illuminate the dark. Wood fires built on the ground, candles, oil lamps, gas lamps and others have been an evolutionary process through the ages. With the advent of electricity and the invention of the incandescent light bulb in the late 19$^{th}$ century our quest for perpetual light was solved. Mankind no longer needed to stumble in the dark with the introduction of a variety of incandescent lighting devices.

Other than the introduction of neon and fluorescent lighting, innovation in the lighting world revolved around various applications of the incandescent light. Colored lights were the result of using colored glass for the bulb or of a colored coating to the lightbulb. However, the use of the incandescent lightbulbs was limited by their relatively inefficient use of electricity resulting in relatively high power consumption and a significantly high thermal signature. Incandescent lights were thus typically relegated to provide white light for general illumination usage. For the most part, decorative lighting was limited to strings of incandescent lights, either white or colored, placed where its heat signature was of minimal consequence and usually only utilized for special occasions to minimize power usage.

The latter part of the 20$^{th}$ century and early 21$^{st}$ century saw the development and introduction the light-emitting diode (LED). An LED is much more efficient in its usage of electricity thus reducing its size and thermal signature relative to an incandescent light and is thus more adaptable to a variety of applications. We have now seen the incandescent light bulb being replaced by the LED light bulb and with multi-colored LEDs now able to emit a variety of colors their use has penetrated almost every aspect of everyday life. The efficiency and low cost of LEDs now make possible lighting devices which are affordable to both purchase and operate and readily adaptable for decorative purposes.

SUMMARY OF THE INVENTION

In accordance with the invention, an elongated hexagonal decorative light system comprises a plurality of light panel assemblies, each light panel assembly further comprising a base having an elongate hexagonal shaped outer periphery, the base defining two connector apertures at each end of the elongate base in a bottom of the base. A printed circuit assembly is mounted to the base and has a plurality of light emitting diodes populated thereon and electronic circuitry for selectively illuminating the light emitting diodes. A plurality of electrical receptacles wherein at least two receptacles are positioned at each end of the printed circuit assembly, each electrical connector in registration with one of the connector apertures defined in the base at each end of the elongate base, and a prismatically shaped lens affixed to an upper surface of the base. A controller has a base receiving an electrical power cord. The power cord is electrically connected to a printed circuit assembly mounted on the base wherein the printed circuit assembly includes the circuitry and logic for controlling the plurality of light panel assemblies. The controller further includes a signal and power cord extending therefrom and terminating with an electrical connector connectively compatible with the receptacles of the light panel assemblies. A plurality of connector cables, each having a multi-lead cable segment terminated at each end with an electrical plug receivable in the electrical receptacles in the light panel assemblies.

a method of using an elongated hexagonal decorative light system includes obtaining at least one elongated hexagonal decorative light system. The light system includes a controller having an electrical power and signal output plug and a plurality of elongated hexagonal decorative light panel assemblies. Each light panel assembly has a base with a plurality of electrical receptacles communicative with a printed wiring assembly and further has a plurality of light emitting diodes populated thereon for desired illumination. A translucent lens is affixed over and attached to the base for permitting the light generated by the light emitting diodes to be visible external to the light panel assembly. The plurality of light panel assemblies are arranged in a desired geometric pattern, and the electrical power and signal plug of the controller is electrically connected to one of the electrical receptacles of a first light panel assembly. A second or more light panel assemblies are electrically connected to the first panel assembly utilizing a connector cord having plugs at each end thereof. One plug is received in one of the remaining electrical receptacles of the first light panel assembly, and a second plug is received in one of the electrical receptacles of the second or more light panel assemblies. Each light panel assembly is assured to have only one connector cable functioning as an electrical power and signal input thereto. A control application is installed on a portable electronic device paired to a Wi-Fi network, and the controller is electronically paired to the Wi-Fi network. A desired operational function of the light system is set utilizing the application installed on the portable electronic device.

In another aspect, the electrical receptacles at each end of the light panel assemblies are aligned parallel to a long axis of the light panel assembly.

In a further aspect, the base includes a visible orientation arrow corresponding to the arrangement orientation of the light emitting diodes on the printed circuit assembly.

In yet another aspect the prismatically shaped lens is translucent.

In another aspect the lens has a raised center and faceted sides, each facet corresponding to a side of the light panel assembly.

In a further aspect the controller further includes a plurality of microswitches electrically interconnected with the controller printed circuit assembly.

In an additional aspect the controller further includes circuitry and logic to be remotely responsive to wireless electronic inputs from a remote electronic device for controlling the plurality of light panels.

In another aspect each of the connector cables is directionally biased to permit flow of electrical signals in one direction only, at least one electrical plug bearing a visible legend identifying the directional bias of the connector cable.

In a further aspect the printed circuit assembly of the light panel assembly further includes circuitry and logic to illuminate the light emitting diodes thereon in a plurality of predetermined patterns and light motions.

In yet an additional aspect, the light panel assemblies of the system are identically responsive to electrical signals from the controller to display identical light patterns and motions concurrently.

In a further aspect, the light panel assemblies of the system are responsive to electrical signals from the controller to display a progressive light pattern and motion across the plurality of the light panel assemblies.

In another aspect the system further includes an octagonal mounting bracket wherein the mounting bracket has a magnet housed therein.

In a further aspect, the light panel assembly base defines a octagonal aperture in a bottom surface thereof for receiving the octagonal mounting bracket.

In an additional aspect, the light assembly base further includes a magnetically sensitive plate mounted over the octagonal aperture in a manner that the magnetic force of the mounting bracket magnet retains the light panel assembly in a desired location and position, the light panel assembly being readily detachable and rotationally repositionable from the octagonal mounting bracket by overcoming the magnetic force.

In another aspect the connector cables are electrically bidirectional.

In a further aspect the printed circuit assembly of the light panel assembly further includes circuitry and logic to determine which of the receptacles at each end of the light panel assembly is functioning as an electrical input and automatically electrically configures the remaining receptacles as electrical outputs.

Further embodiments and features of the invention will become apparent in conjunction with the detailed description of the inventions and their preferred embodiments provided hereafter.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

Figure 1:
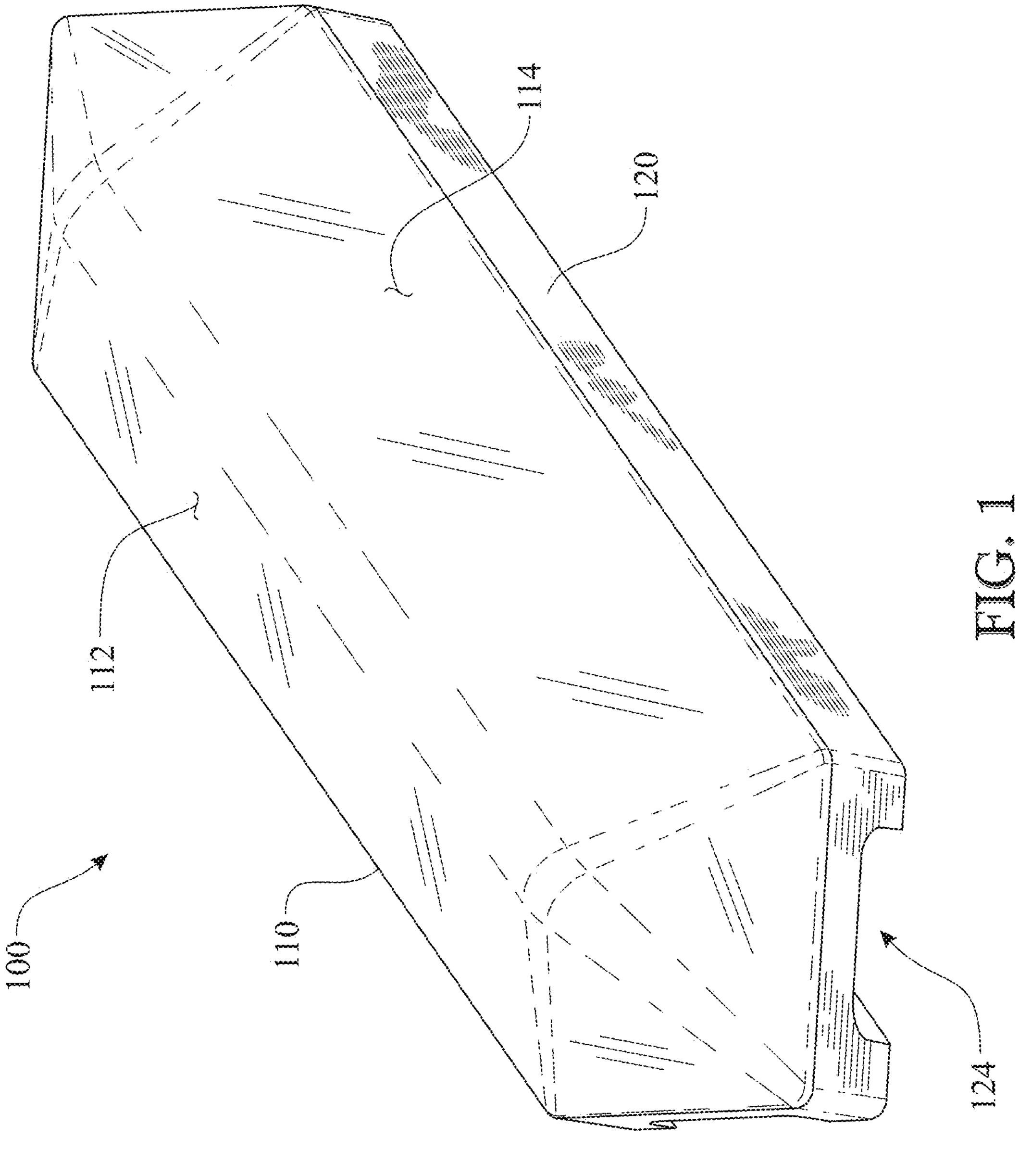
FIG. 1 presents an isometric top, right front view of an elongated hexagonal shaped light panel according to the present invention.
Figure 2:
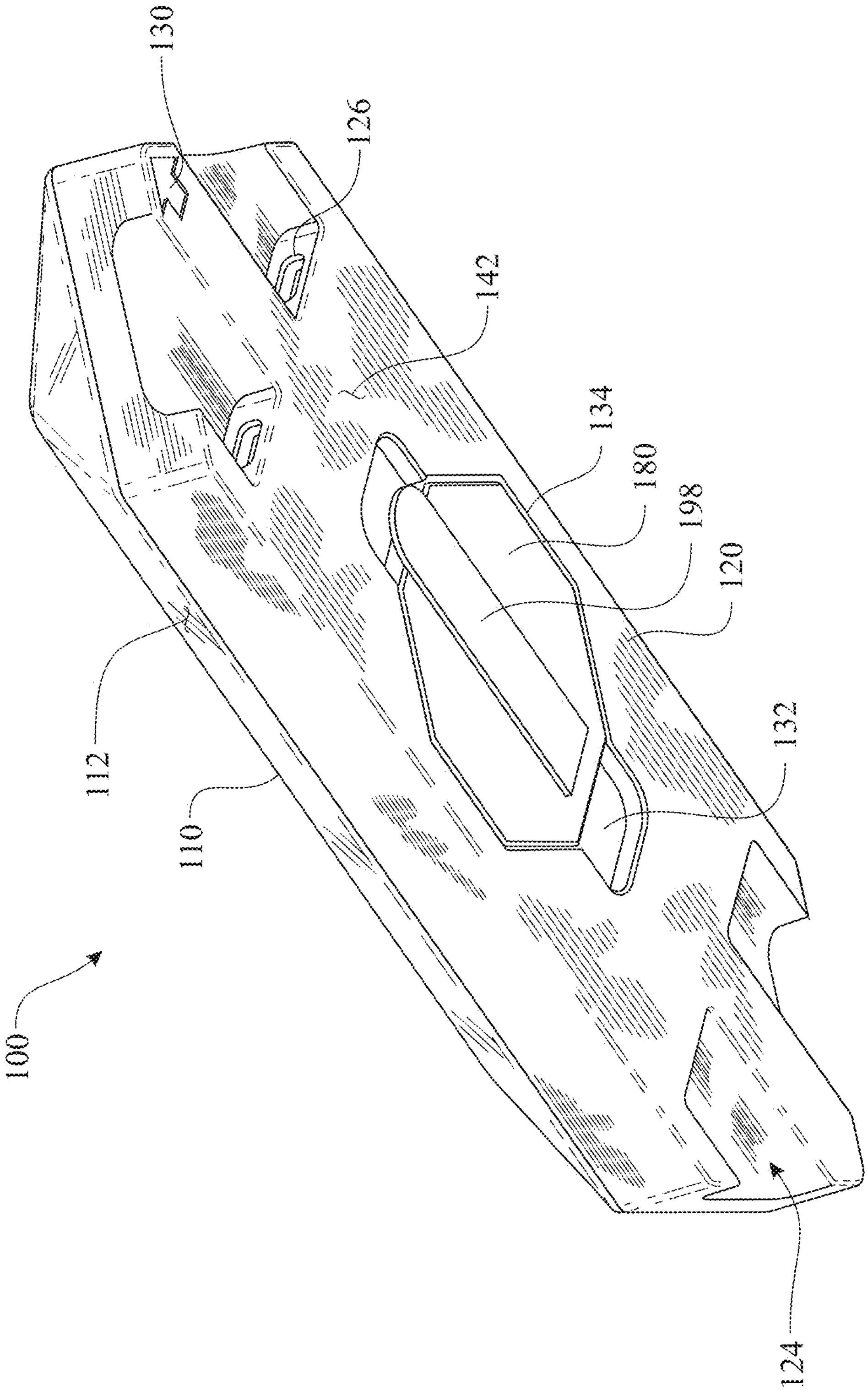
FIG. 2 presents an isometric bottom, left rear view of the hexagonal shaped light panel.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 4. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Turning now to the drawings, and in particular, FIGS. 1-14 and 17, an exemplary elongated hexagonal light panel assembly 100 is illustrated. FIGS. 8-14 present various cross-section drawings through the light panel assembly 100 to further illustrate the construction and identify the features and components of the light panel assembly. The elongated hexagonal light panel assembly includes a base 120 molded of a resin having an external periphery and an upper edge in the shape of an elongated hexagon and forming an internal cavity. A top lens 110 formed of a translucent resin is affixed to the upper peripheral edge of the base utilizing ultrasonic welding, thermal welding, chemical adhesive, or other such method known in the art. The top lens is prismatically formed to create a raised lens with facets 112, 114 for enhanced visibility.

The bottom surface 142 of the base 120 is formed such that the structure 122 of the base forms two connector recesses 124 at each of the right and left ends. Each connector recess 124 further defines a connector port 126 extending through the structure. Additionally, an octagonal aperture is formed in the center of the base 120 and is defined by an octagonally shaped internal wall 134. The base further forms a finger recess 132 at each of the left and right ends of the octagonal aperture. An orientation arrow 130 is integrally formed in the bottom surface 142 of the base 120 and at the left end thereof. The orientation arrow is utilized for reference purposes when integrally interconnecting multiple ones of the light panels 100.

Figure 3:
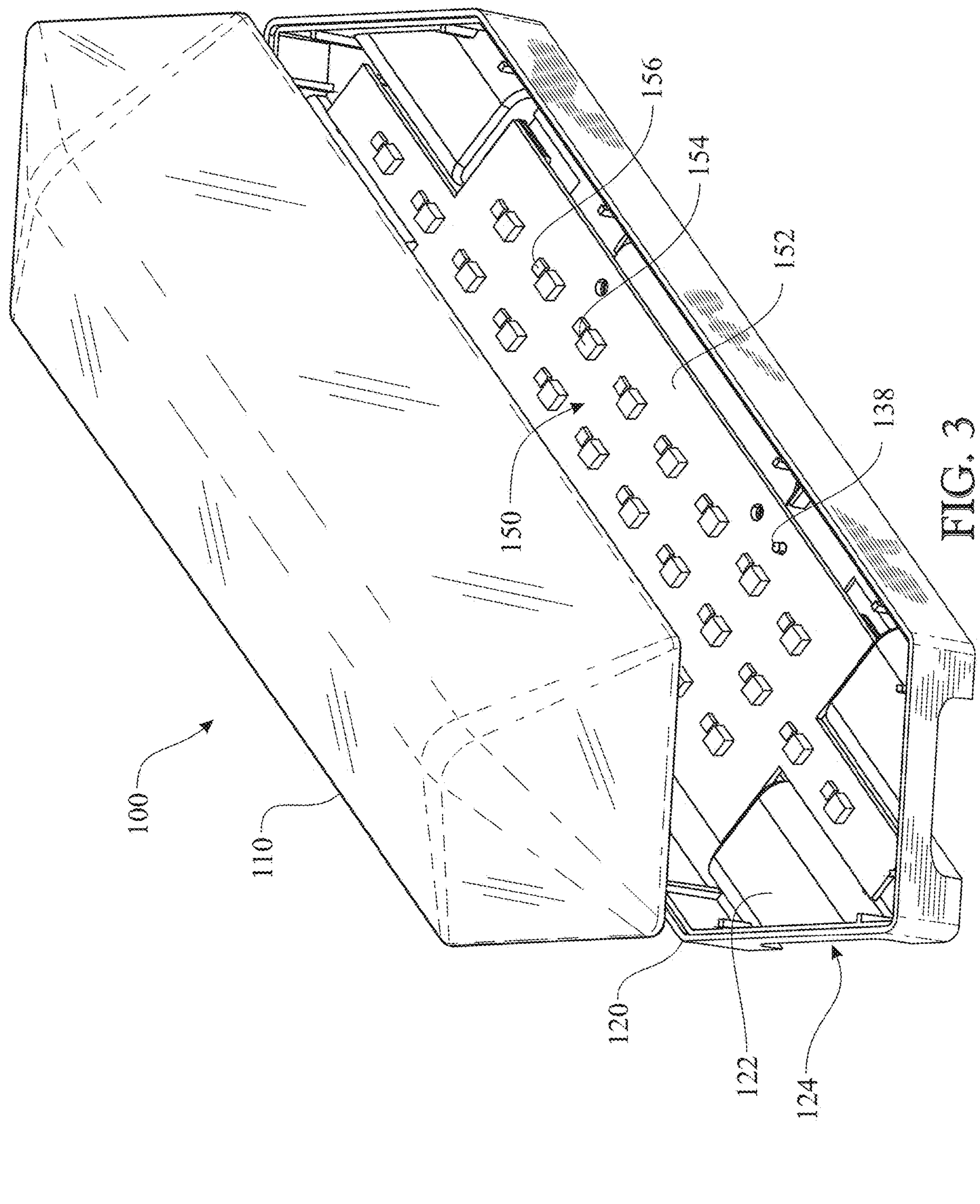
FIG. 3 presents a partially exploded isometric top, right front view of the elongated hexagonal shaped light panel.
Figure 4:
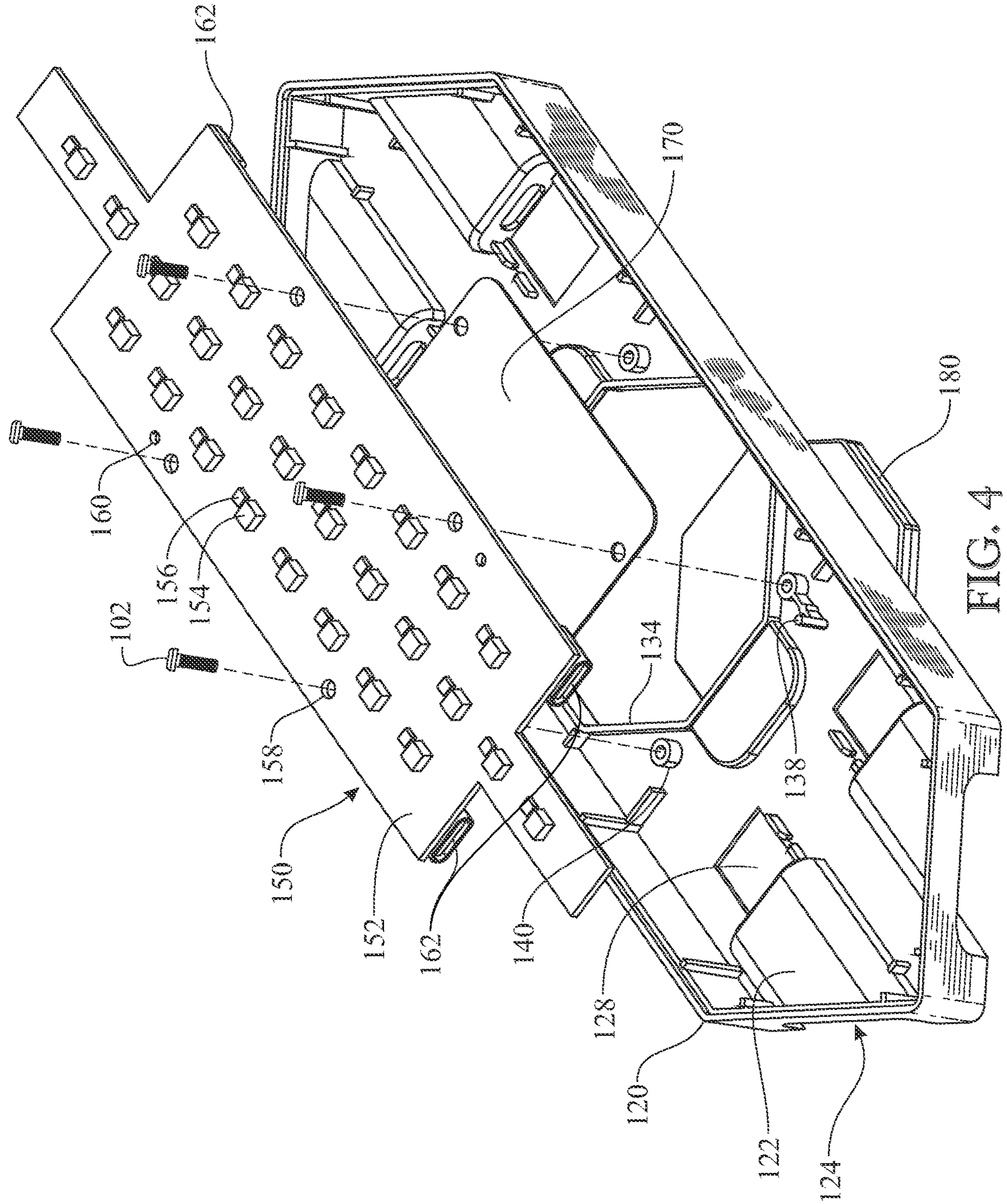
FIG. 4 presents an exploded isometric top, right front view of the elongated hexagonal shaped light panel with the top lens cover removed.
Figure 5:
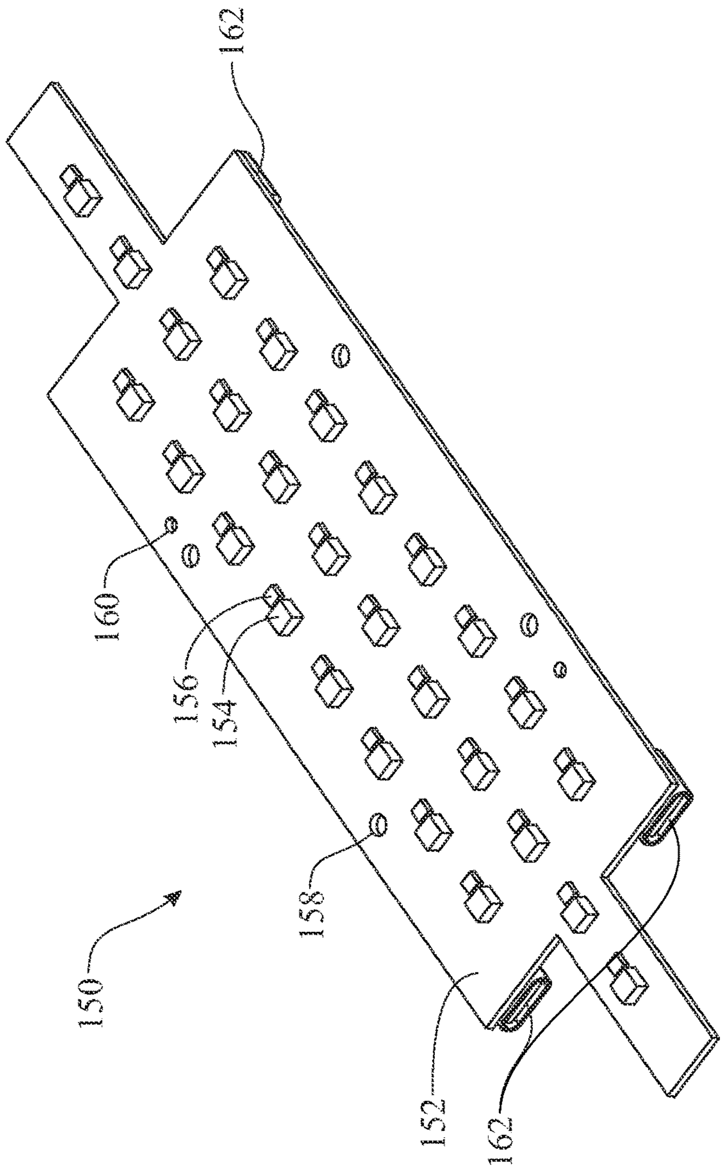
FIG. 5 presents an isometric view of the printed circuit assembly populated with a plurality of multi-colored LEDs.

Internally, and as shown in FIGS. 3-5 a plate 170 formed from steel or other rigid ferrous material sensitive to magnetic force covers the octagonal aperture through the central portion of the base 120. A printed circuit board 152 populated with a plurality of light emitting diodes (LEDs) 154, 156 on an upper surface to form a printed circuit assembly (PCA) 150 which extends from a left side of the light panel assembly 100 to the right side of the light panel assembly 100. The LEDs 154, 156 are substantially uniformly distributed on the PCA 150 to provide a uniform intensity of light emitting therefrom when all of the LEDs 154, 156 are lit with the same light intensity. There are two types of LEDs populated thereon. A first type of LED 156 illuminates with a white light and a second type of LED 154 illuminates with colored light wherein the particular color illuminated thereby is a function of the voltage supplied to the LED 154 as known in the industry. The PCA 150 includes two registration holes 160 which receive registration pins 138 integrally formed with the interior portion of the base 120 for the proper registration of the PCA 150 within the light panel assembly 100. The PCA 150 and the steel plate 170 are affixed within the base with four mounting screws 102 which extend through mounting holes 158 in the PCA 150 and are received in the mounting screw receptacles 140 also formed in the interior of the base 120. The mounting screws can further be magnetic to temporarily attach to a screwdriver to aid in the installation thereof.

Electrical receptacles 162 (also referred to herein as connector receptacles 162) are mounted to the bottom of the printed circuit board 152 and electrically interconnected with electronic components populated thereon for operational control and powering of the LEDs 154, 156. The electrical receptacles 162 are aligned parallel to a long axis of the elongate base and positioned such that when the PCA 150 is positioned on the registration pins 138, each electrical receptacle 162 is in longitudinal registration with one of the connector ports 126 formed in the base 120. The bottom 142 of the base 120 may further include a recess 128 formed therein to prevent interference of the shell of electrical receptacles 162 with the bottom 142 of the base 120.

Figure 6:
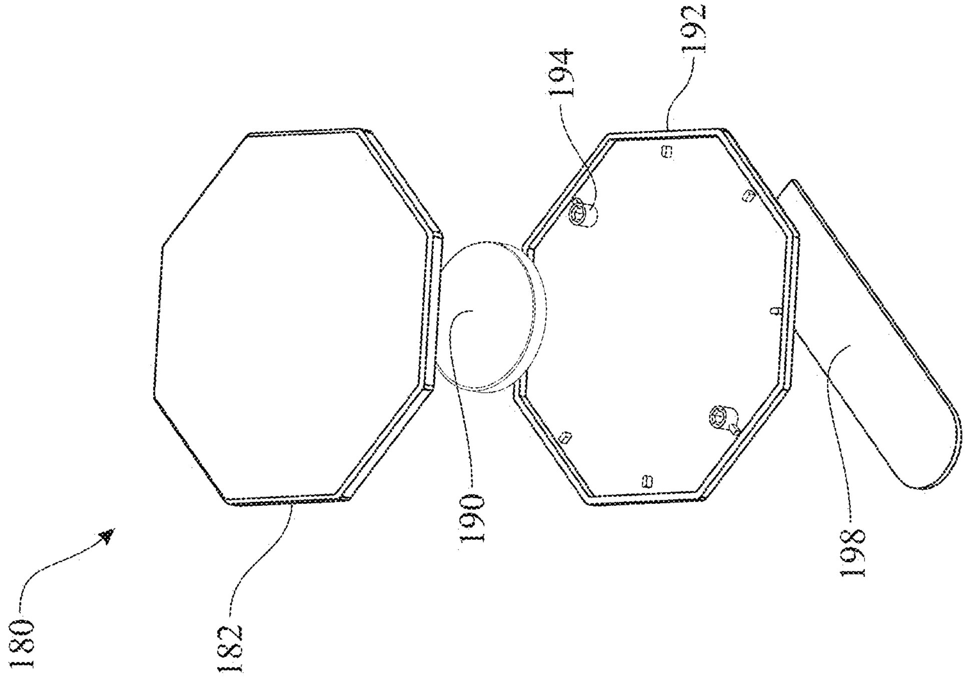
FIG. 6 presents an exploded top isometric view of a hexagonal mounting bracket.
Figure 7:
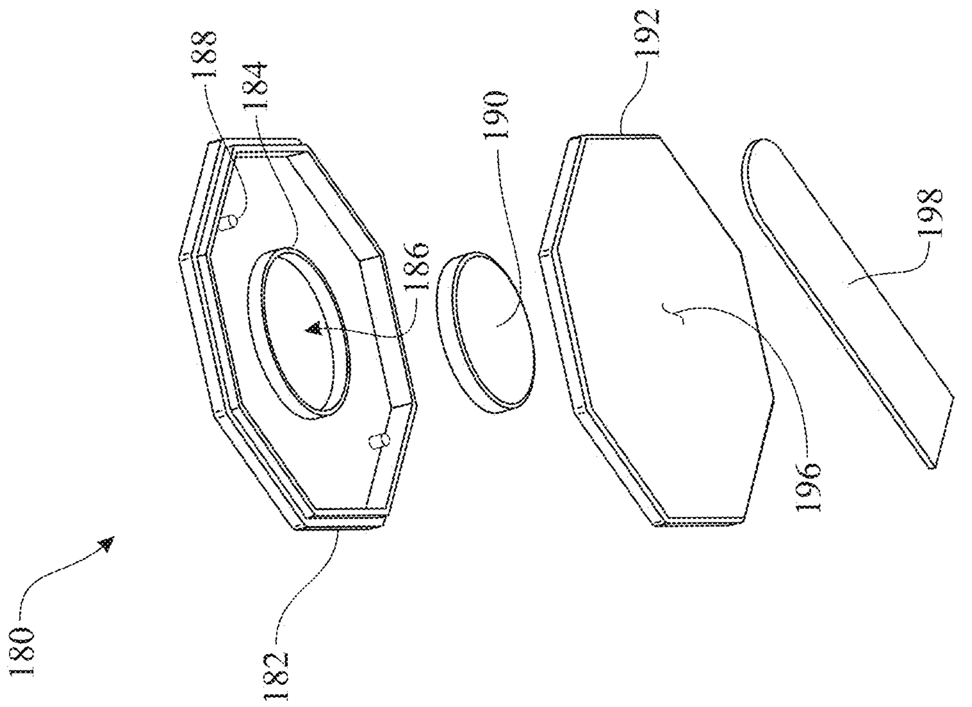
FIG. 7 presents an exploded bottom isometric view of the hexagonal mounting bracket.
Figure 8:
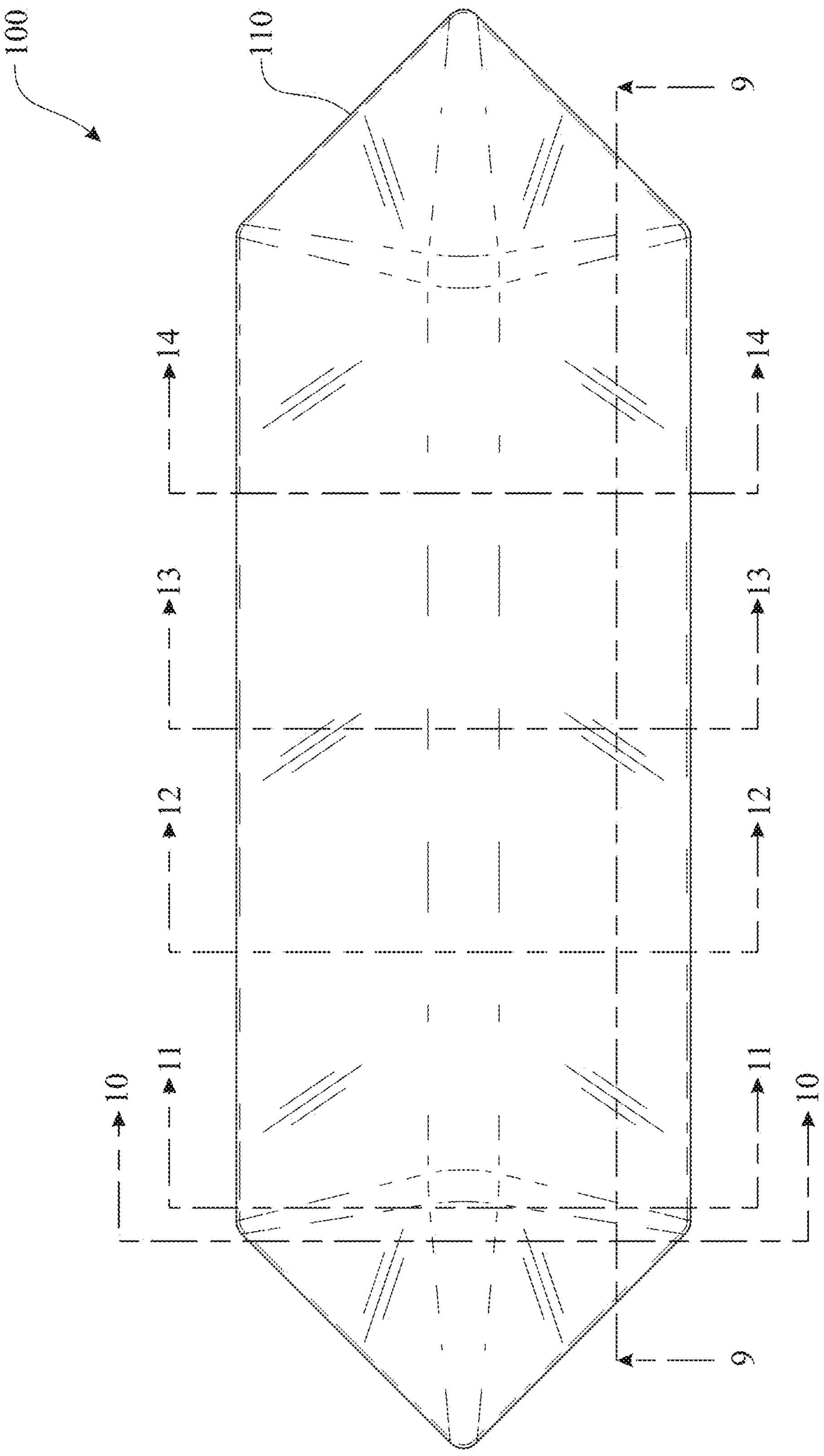
FIG. 8 presents a top view of the elongated hexagonal light panel.
Figure 9:
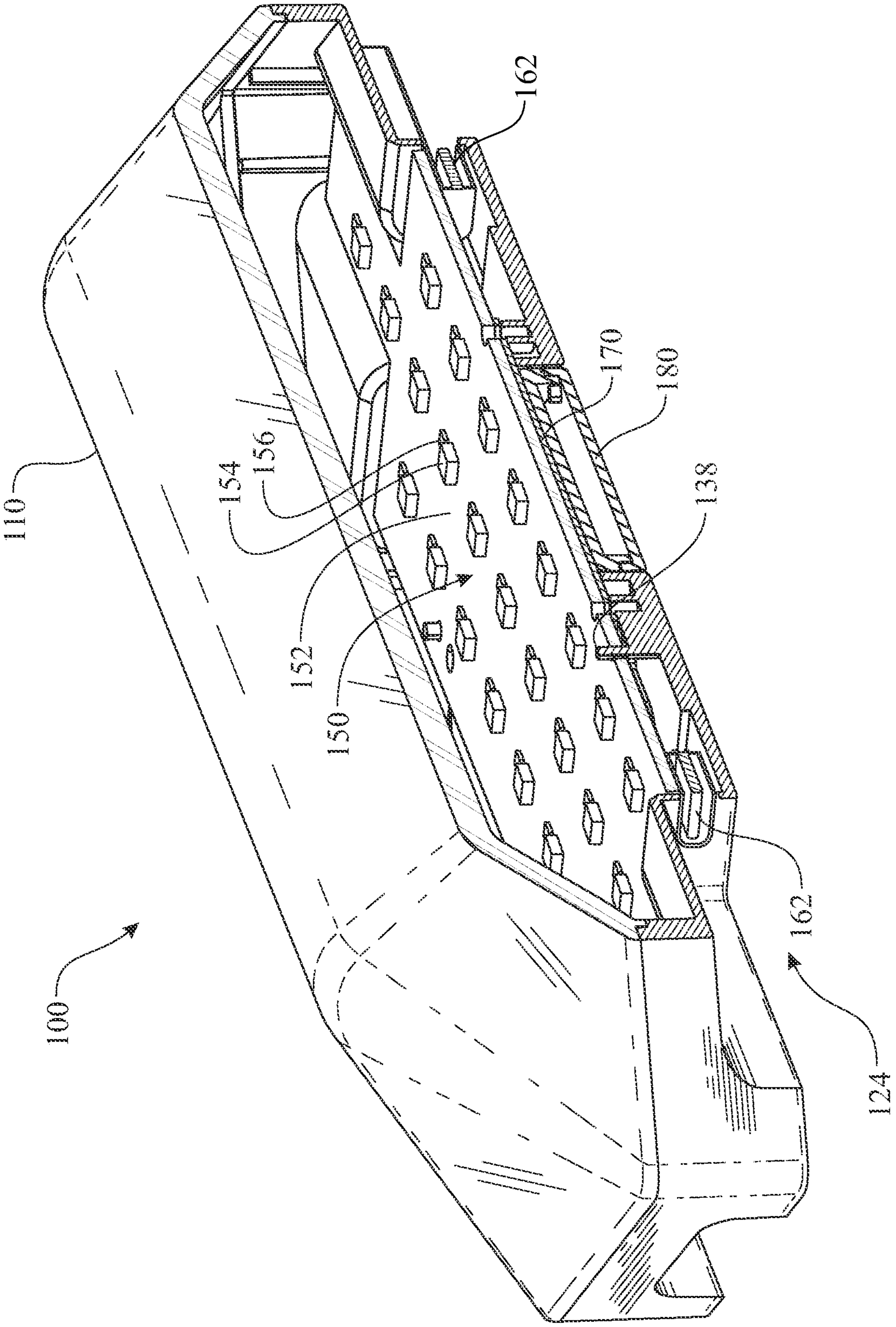
FIG. 9 presents an isometric top, right front sectional view of the elongated hexagonal light panel taken along the line 9-9 of FIG. 8.
Figure 10:
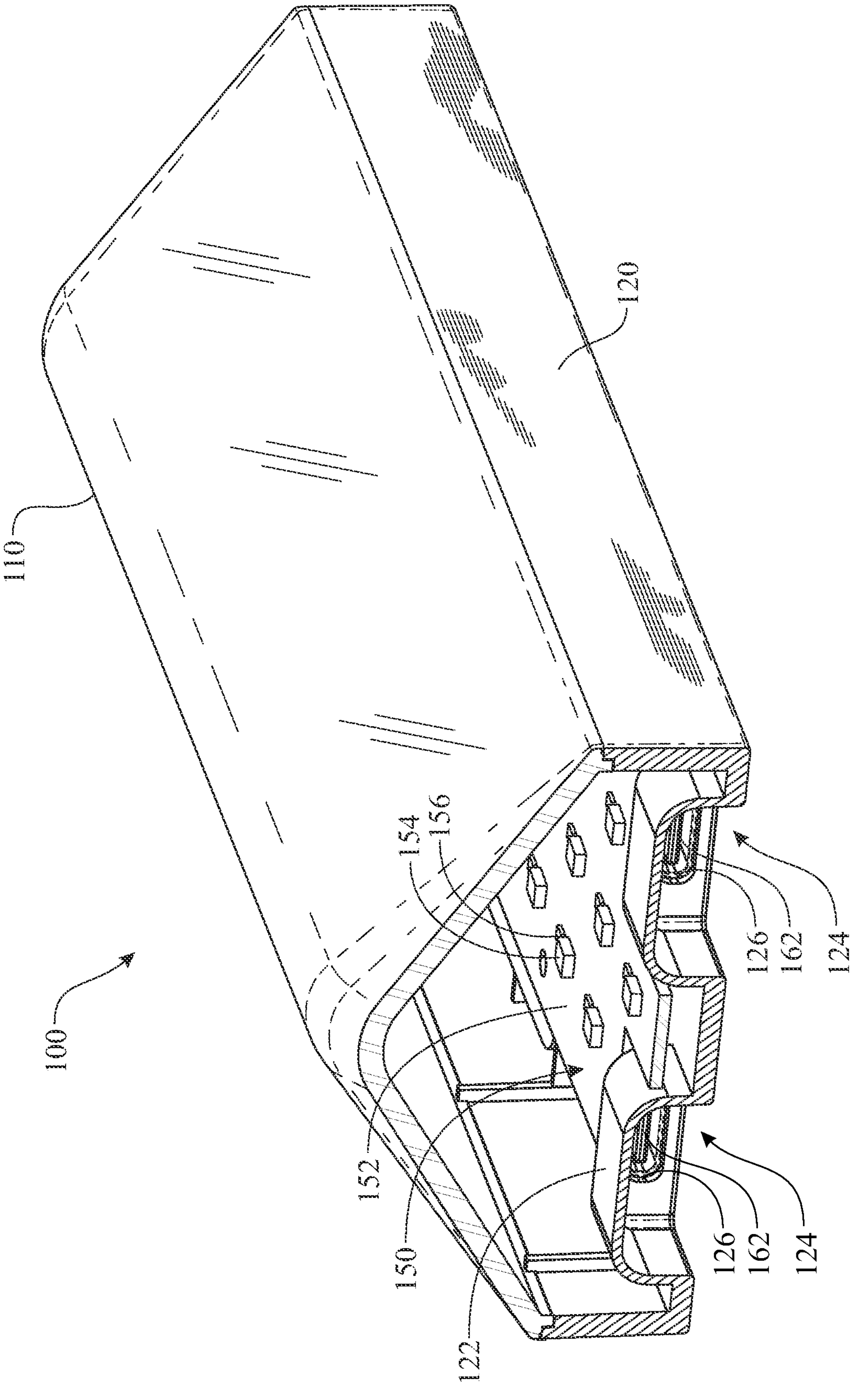
FIG. 10 presents an isometric top, right front sectional view of the elongated hexagonal light panel taken along the line 10-10 of FIG. 8.
Figure 11:
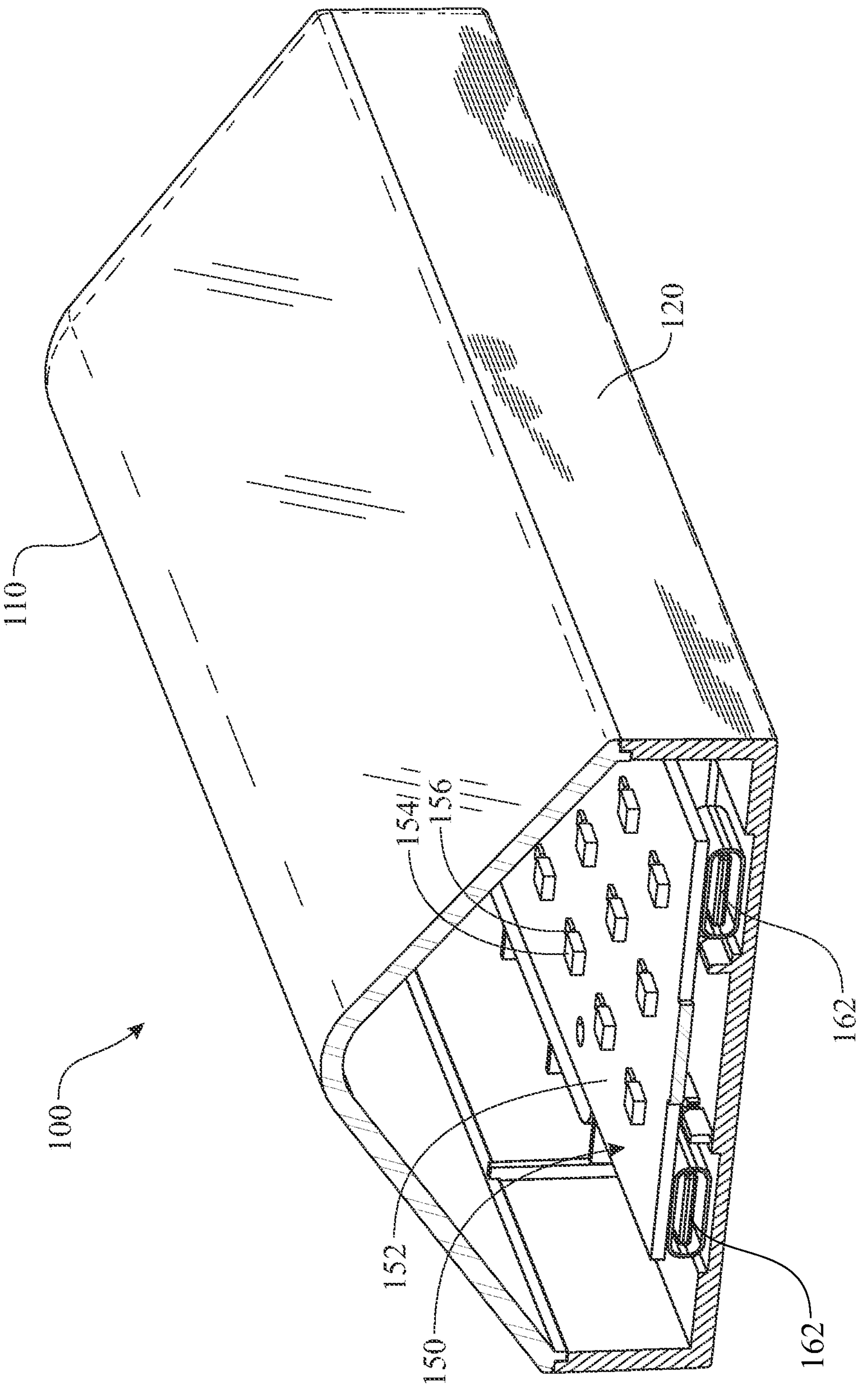
FIG. 11 presents an isometric top, right front sectional view of the elongated hexagonal light panel taken along the line 11-11 of FIG. 8.
Figure 12:
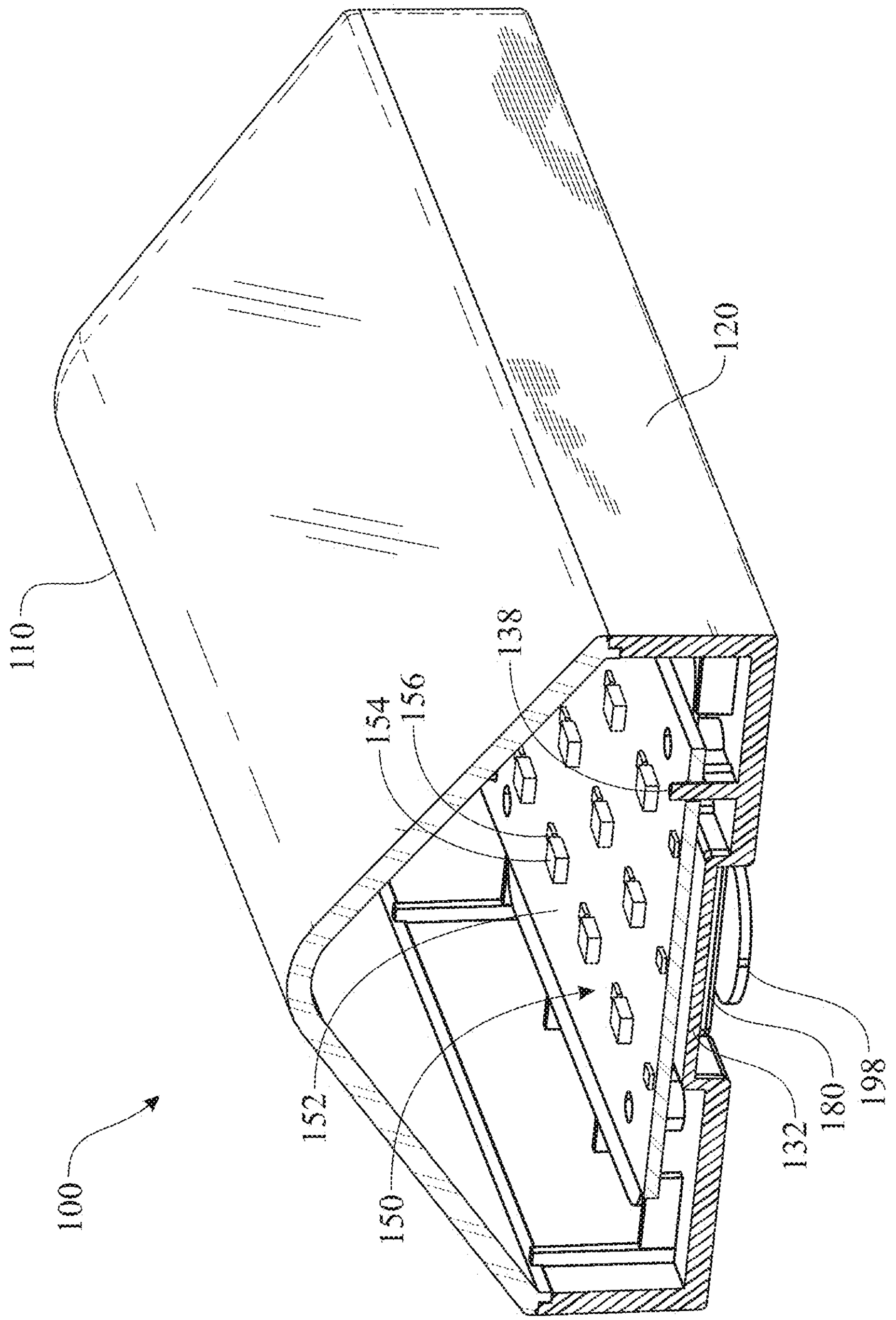
FIG. 12 presents an isometric top, right front sectional view of the elongated hexagonal light panel taken along the line 12-12 of FIG. 8.
Figure 13:
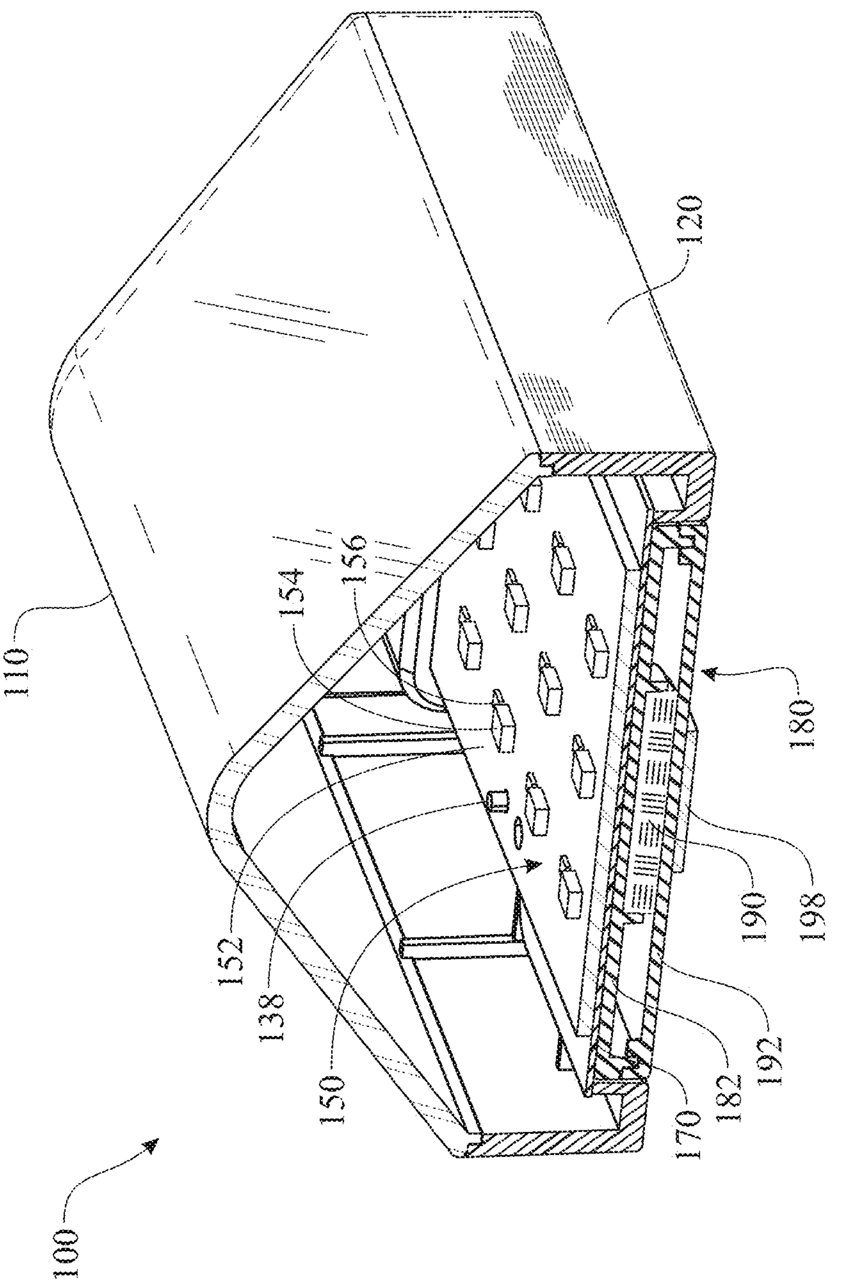
FIG. 13 presents an isometric top, right front sectional view of the elongated hexagonal light panel taken along the line 13-13 of FIG. 8.
Figure 14:
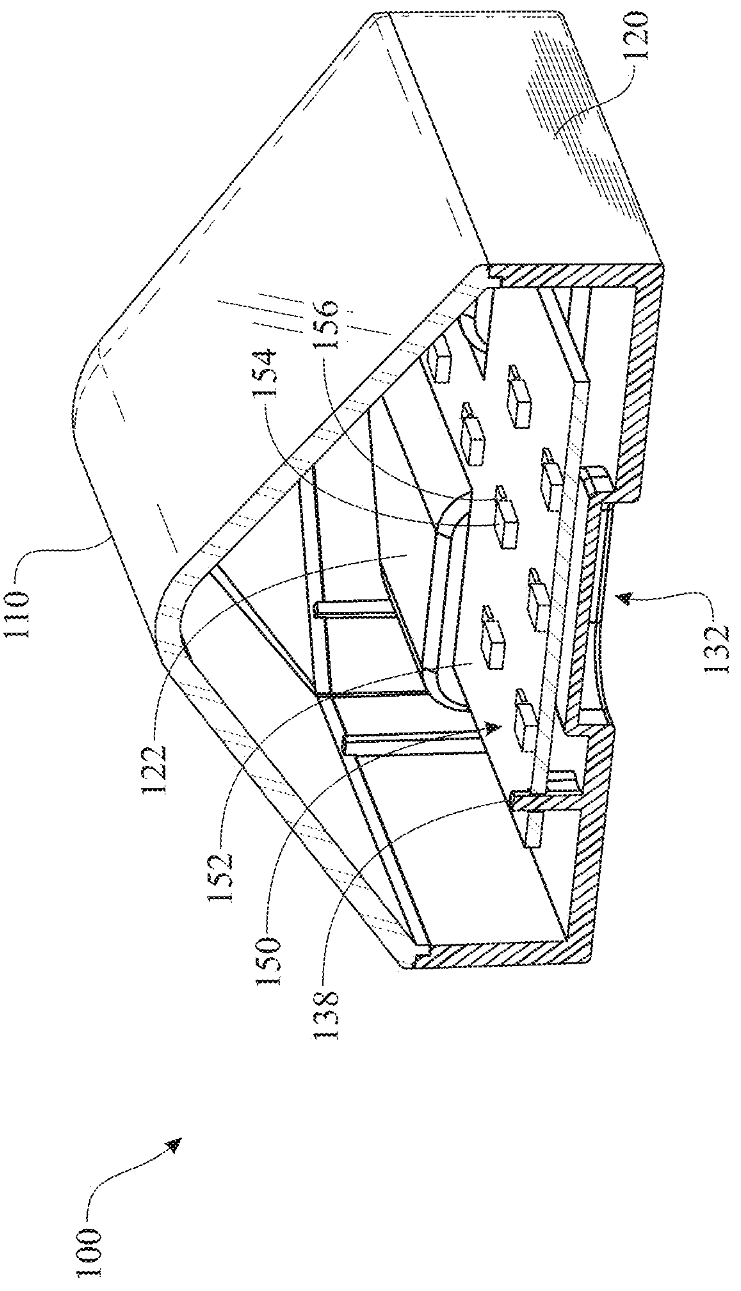
FIG. 14 presents an isometric top, right front sectional view of the elongated hexagonal light panel taken along the line 14-14 of FIG. 8.

Referring now to FIGS. 6-7, an octagonal mounting bracket 180 is illustrated in a exploded form wherein an octagonally shaped base 182 has formed therein a circular rib 184 defining a circular recess 186, and registration pins 188 are integrally formed within the base 182. A disk-shaped magnet 190 is received in the circular recess 186 and an octagonally shaped top 192 which includes pin receptacles 194 is mated to the base 182 such that the registration pins 188 are received in the pin receptacles 194 for proper alignment of the top 192 to the base 182. The top 192 can be bonded to the base 182 using ultrasonic welding, chemical adhesive is, or other such bonding methods known in the art. A double-sided adhesive strip 198 has one side adhesively affixed to the outer surface 196 of the mounting bracket 180, the other side of the adhesive strip to be utilized for mounting the bracket to a wall or other such surface where the light panel assembly is desired to be displayed. The octagonally shaped mounting bracket 180 is received in the octagonal aperture of the light panel assembly base 120 and is removably retained therein by the magnetic attraction of the mounting bracket magnet 190 to the steel plate 170 mounted at the octagonal aperture of the base 120. The mounting bracket 180 permits the use of a damage-free removable adhesive strip that can be completely hidden when the system is mounted and fully assembled. The use of the removable adhesive strip creates a clean final appearance and allows the user to easily remove panels and break the adhesive bond between the mounting bracket 180 and the surface to which the mounting bracket 180 is attached.

While the octagonal mounting bracket 190 and corresponding octagonal aperture defined by wall 134 and ferrous plate 170 have been described herein, other mounting configurations are also contemplated. Although not illustrated herein such mounting configurations as a hook and eye, hook and loop, reusable gel-based micro-suction and other similar methodologies are also possible.

Figure 15:
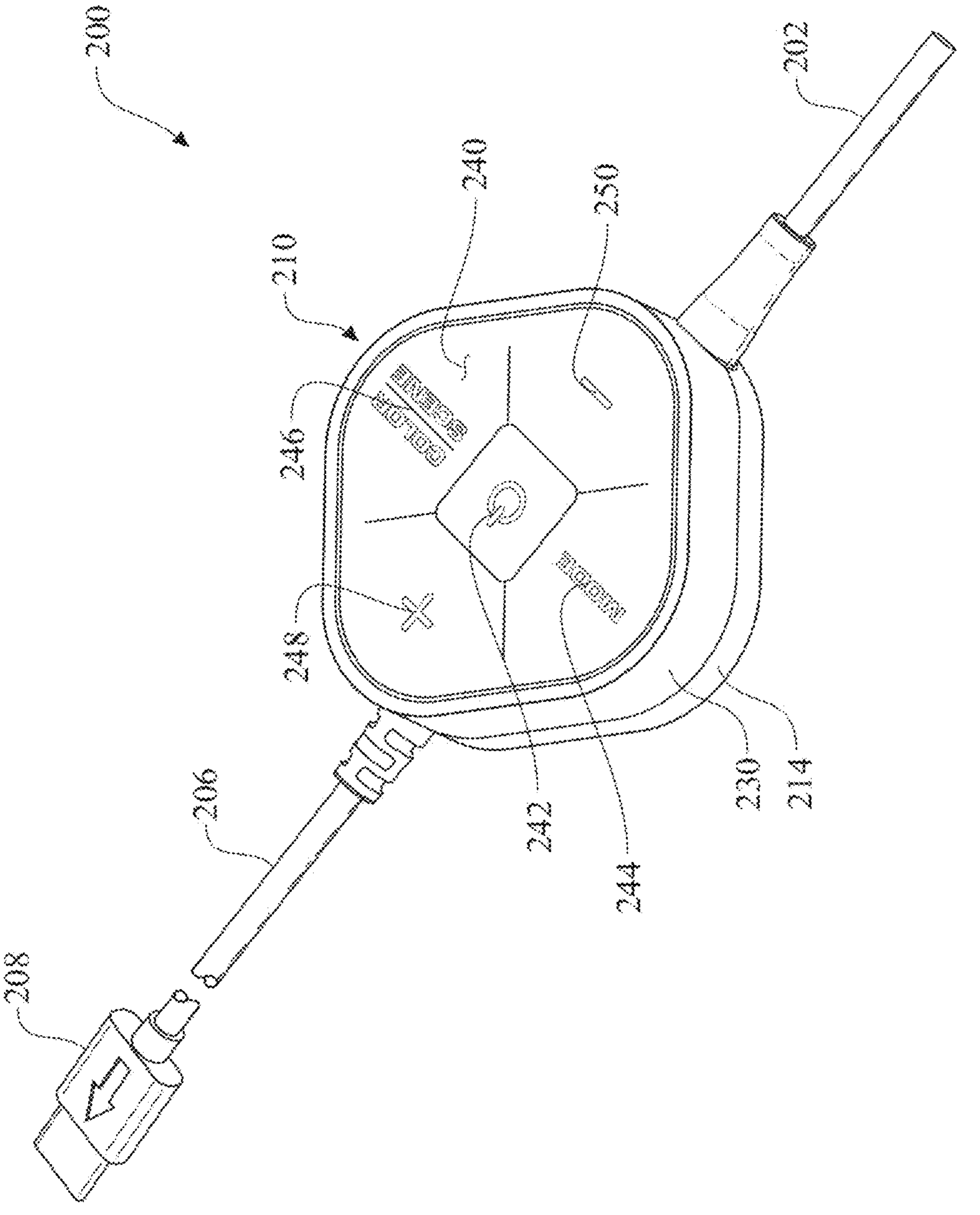
FIG. 15 presents an isometric view of an electronic controller for the decorative light system.
Figure 16:
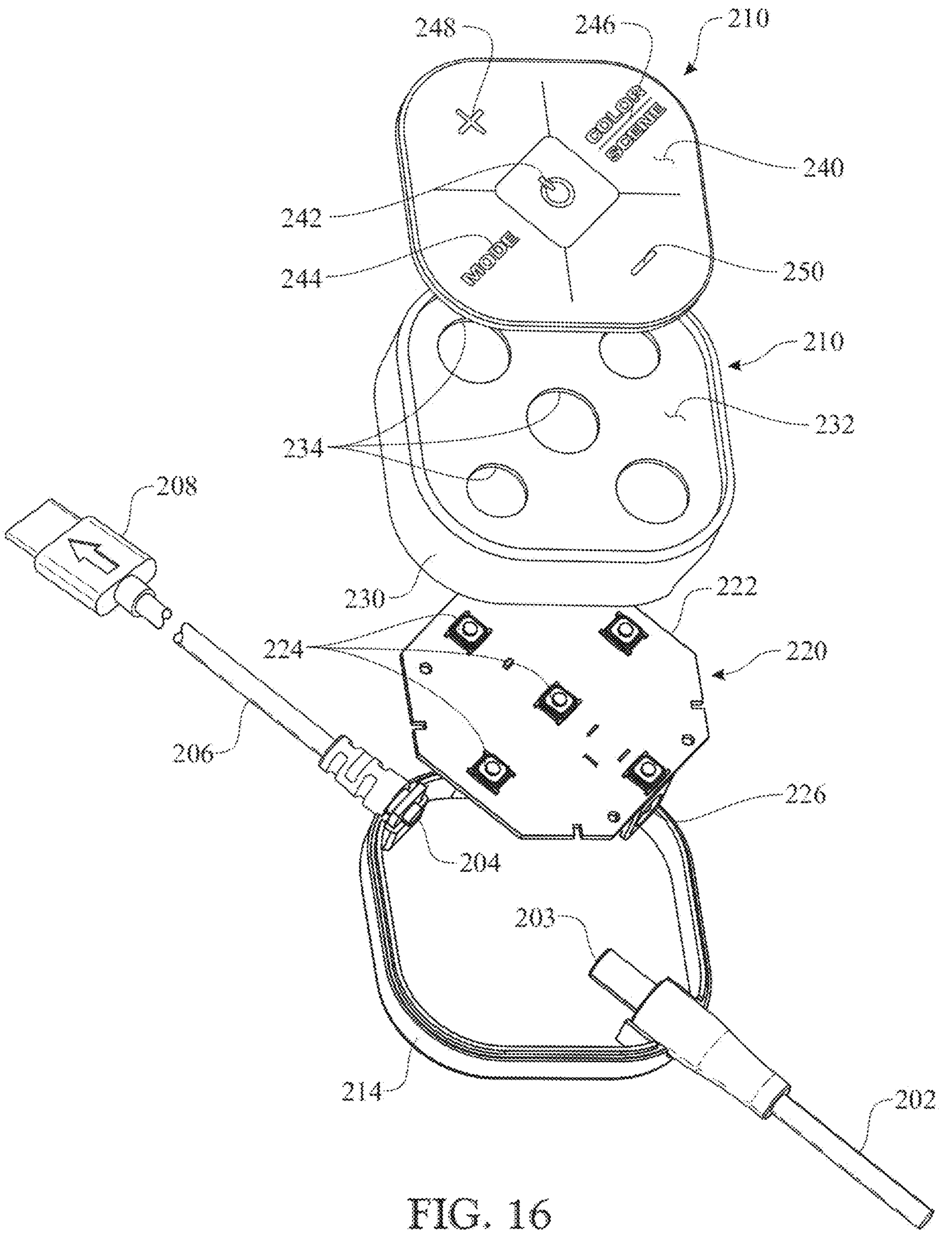
FIG. 16 presents an exploded isometric view of the electronic controller.
Figure 17:
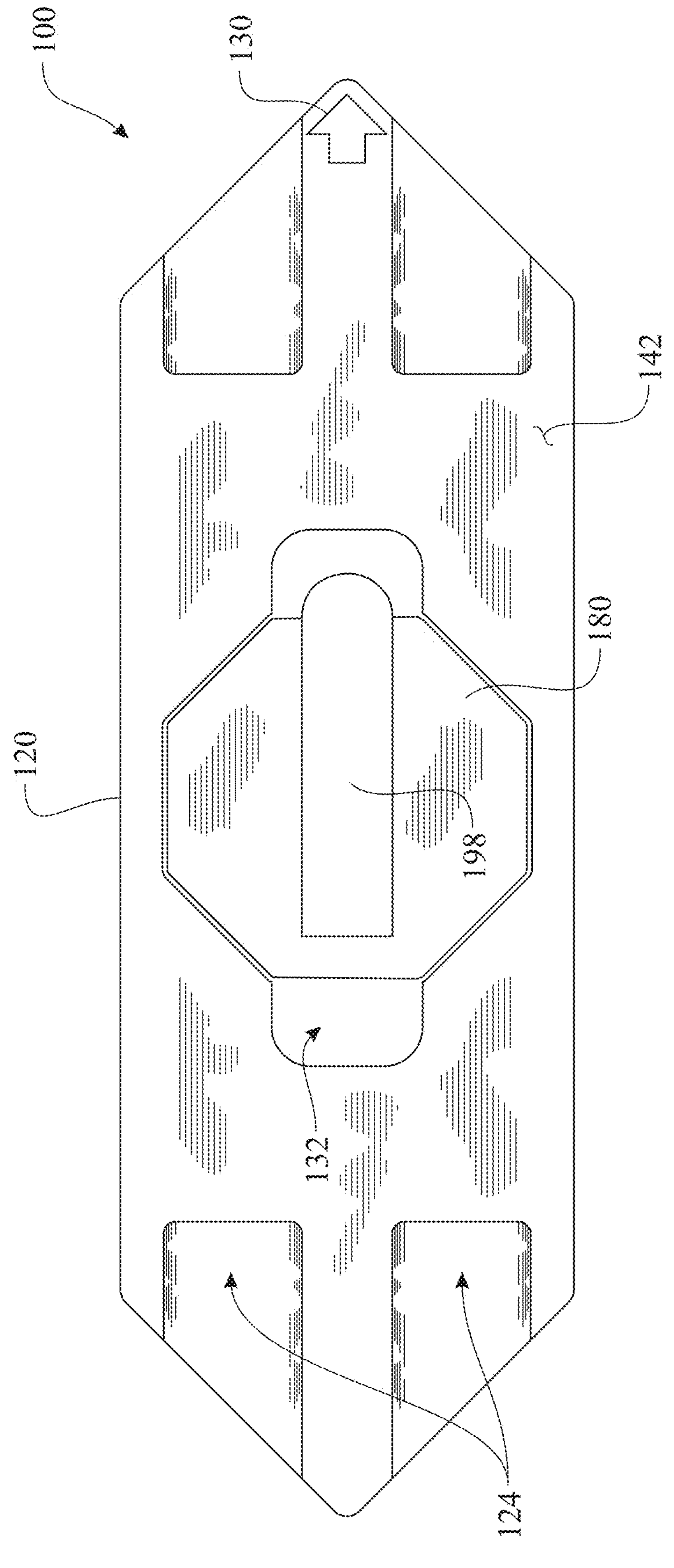
FIG. 17 presents a bottom view of the elongated hexagonal light panel.

A controller 200 external to the light panel assembly 100 is part of the lighting system and is illustrated in FIGS. 15-16. The controller includes a base 214 into which is received one end of a power cord of a known configuration. The base further includes a signal and power cord 206 extending therefrom and terminated with an electronic plug 208 compatible with the connector receptacles 162 at the base 120 of the light panel assemblies 100. A printed circuit assembly 220 comprises a printed circuit board 222 and on an upper surface thereof is mounted a plurality of microswitches 224. A lower surface of the PCA includes a power receptacle (not shown) for receiving the power plug 203 of the power cable 202. Micro circuitry (not shown) for generating control signals to the light panel assemblies 100 is also mounted on the lower surface of the PCA 220. A body 210 is mated to the base 214 and has a recessed face 232 which defines a plurality of apertures 234, each aperture 234 located to be in registration with one of the microswitches 224. A flexible membrane 240 is affixed to the recessed face 232 and includes a plurality of legends 242, 244, 246, 248, 250 printed thereon. Each legend 242, 244, 246, 248, 250 is positioned over a respective microswitch 224 to indicate the function of that microswitch 224. These functions include “on/off” 242, “mode select” 244, “color/scene select” 246, “intensity increase” 248, and “intensity decrease” 250 designators. The PCA 220 can also include on an upper surface thereof an LED (not shown) which can be illuminated in either a steady fashion or a blinking fashion to designate different phases of the controller 200 status.

Further, the PCA 220 can include the processing capability and resident instruction sets to be paired with a Wi-Fi system in a manner known in the art. Remote control of the controller functions for the elongated hexagonal decorative light system can be facilitated by the inclusion of an application on a smart phone also paired with the Wi-Fi system or other pairings of a known type to facilitate remote wireless control.

Figure 18:
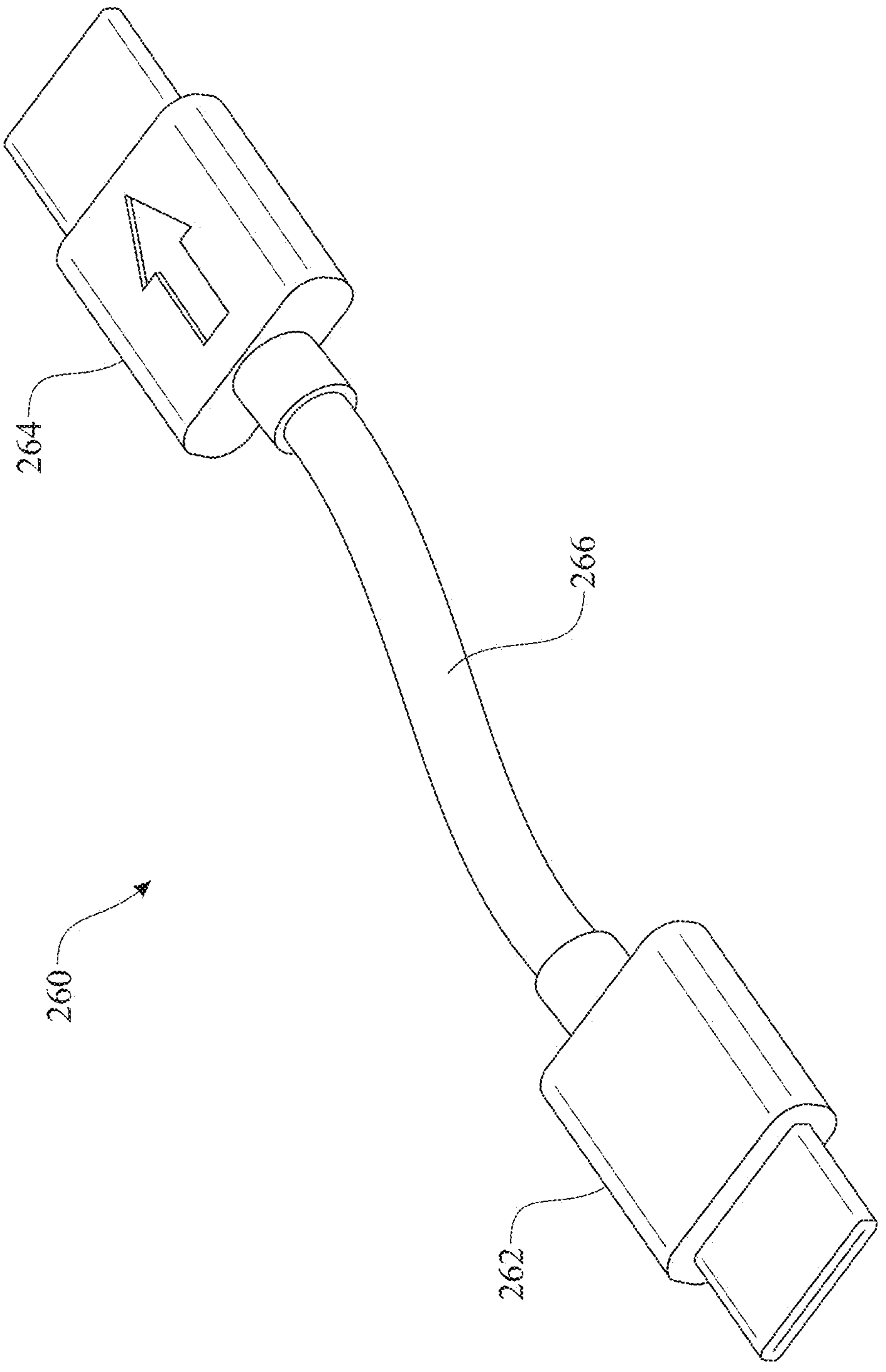
FIG. 18 presents an isometric view of a connector cable for interconnecting adjacent light panels.

Referring to FIG. 18, a short connector cable 260 is provided to interconnect a first light panel assembly 100 with a second light panel assembly 100. The connector cable 260 comprises a short multi-lead cable segment 266 which is terminated at each end with an electrical plug 262, 264 of a configuration compatible with the receptacles 162 mounted to the bottom of the PCA 150 within the light panel assembly 100. While each of the end plugs 262, 264 are identical in function, one or both may be color-coded or marked for reference purposes as described further below. The connector cable 260 is directionally biased to permit electrical signal transmitted therethrough is one direction only.

In an alternate configuration, the connector cable 260 does not include biasing diodes and circuitry and performs its interconnectivity function in any orientation. While the necessity for limiting the connectivity between adjacent light panel assemblies 100 to only one electrical input is still a requirement, this function is relocated to the PCA 150 in each light panel assembly 100. This circuitry detects which of the receptacles 162 is functioning as an input and automatically configures the remaining receptacles 162 as outputs. In this manner, the user need only arrange the light panel assemblies according to a desired visual light pattern without the concurrent necessity of reconfiguring the connector cable 260 to accomplish the required electrical flow pattern.

In use, one or more of the elongated hexagonal light panels 100 can be mounted to a wall or other surface by removing the protective layer of the double-sided adhesive element 198 on the mounting bracket 180 and then firmly pressing the unit against the surface. Once the adhesive bond to the surface, the individual light panel 100 can be disengaged from the mounting bracket 180 by overcoming the magnetic force between the magnet 195 and the steel plate 170 and rotating the light panel assembly in any one of eight different orientations, and then again engage the mounting bracket 180 by receiving the mounting bracket 180 within the octagonal aperture 134. Each light panel assembly 100 of a desired system of light panels 100 is mounted in a like manner.

Figure 19:
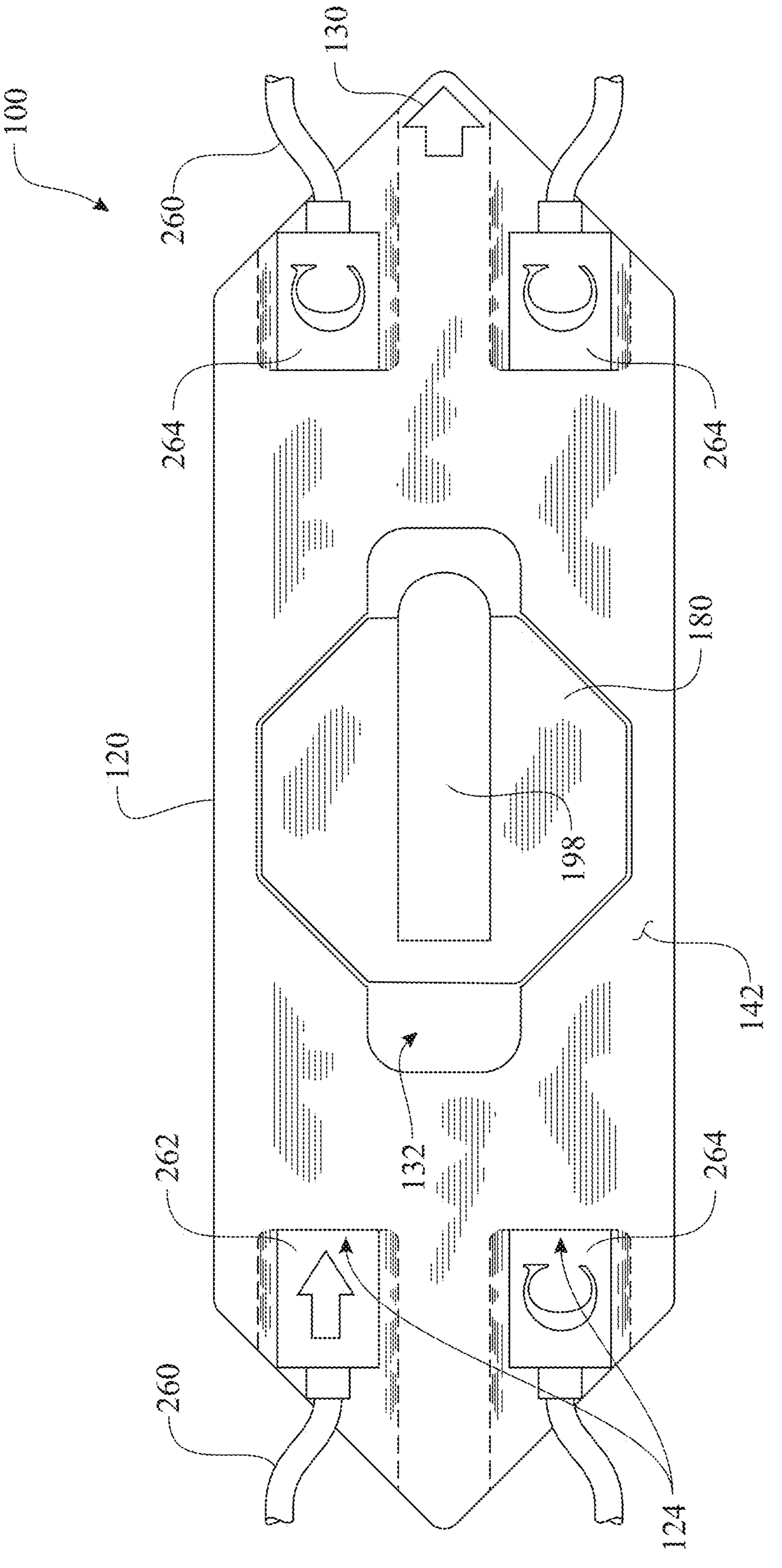
FIG. 19 presents a bottom view of the elongated hexagonal light panel with connector cables engaged in the light panel bottom receptacles.
Figure 20:
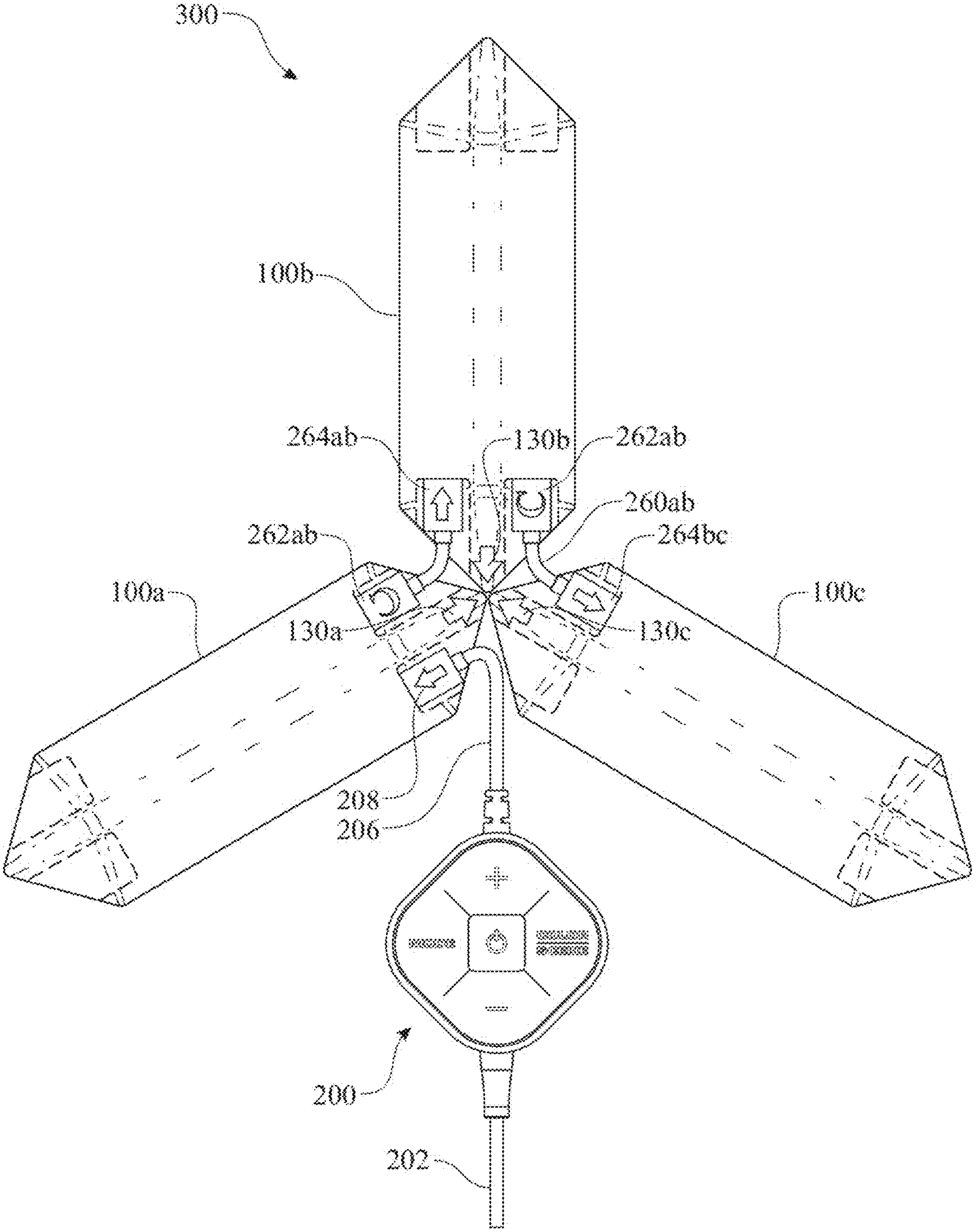
FIG. 20 presents a system of decorative elongated hexagonal light panels and an associated controller illustrating a first interconnective configuration.

To interconnect a plurality of light panel assemblies, and as best illustrated in FIGS. 19-20, an output connector 262 of a connector cable 260 or the output plug 208 from the controller 200 is plugged into one of the receptacles 162 in the base 120 of a first light panel assembly 100. From the first light panel assembly 100*a* (FIG. 20) additional light panel assemblies 100*b*, 100*c* are interconnected wherein at least a second light panel assembly 100*b* is interconnected thereto with one of the connector cords 260. A first end of the connector cord 264*ab* is connected to one of the three remaining connector receptacles 162 in the base 120 of the first light panel assembly 100*a* and the second end is connected to one of the connector receptacles 162 in the second light panel assembly 100*b*. While each of the four connector receptacles 162 in the base of a light panel assembly are identical and can be used interchangeably, at any one time only one connector receptacle 162 can be used as a power/signal input. The other three receptacles 162 are then relegated to an output function to a subsequent light panel assembly 100 if so desired. To function properly, a light panel assembly can have only one input. Optionally, the connector cords can be color-coded or otherwise marked to aid the installer in maintaining a desired input/output directionally biased configuration for each light panel assembly.

As illustrated in FIG. 20, multiple light panel assemblies 100*a*-100*c* can be interconnected for control by the controller 200. The output connector 208 from the controller 200 is received in one of the receptacles 162 of light panel 100*a*. A connector cable 260*ab* is utilized to electrically connect light panel assembly 100*a* to light panel assembly 100*b* by inserting input plug 262*ab* into one of the remaining receptacles 162 in the base 120 of light panel assembly 100*a* and the output plug 264*ab* into one of the receptacles 162 of the light panel assembly 100*b*. In like manner, a third light panel assembly 100*c* can be cascaded onto light panel assembly 100*b* in a like manner while insuring that the cascaded light panel 100*c* receives only one input connector 262 and all remaining connector cables 260 connected to the light panel assemblies 100*b*-100*c* utilize the output connector 264 to maintain the electrical signal biasing in a direction away from controller 200.

Figure 21:
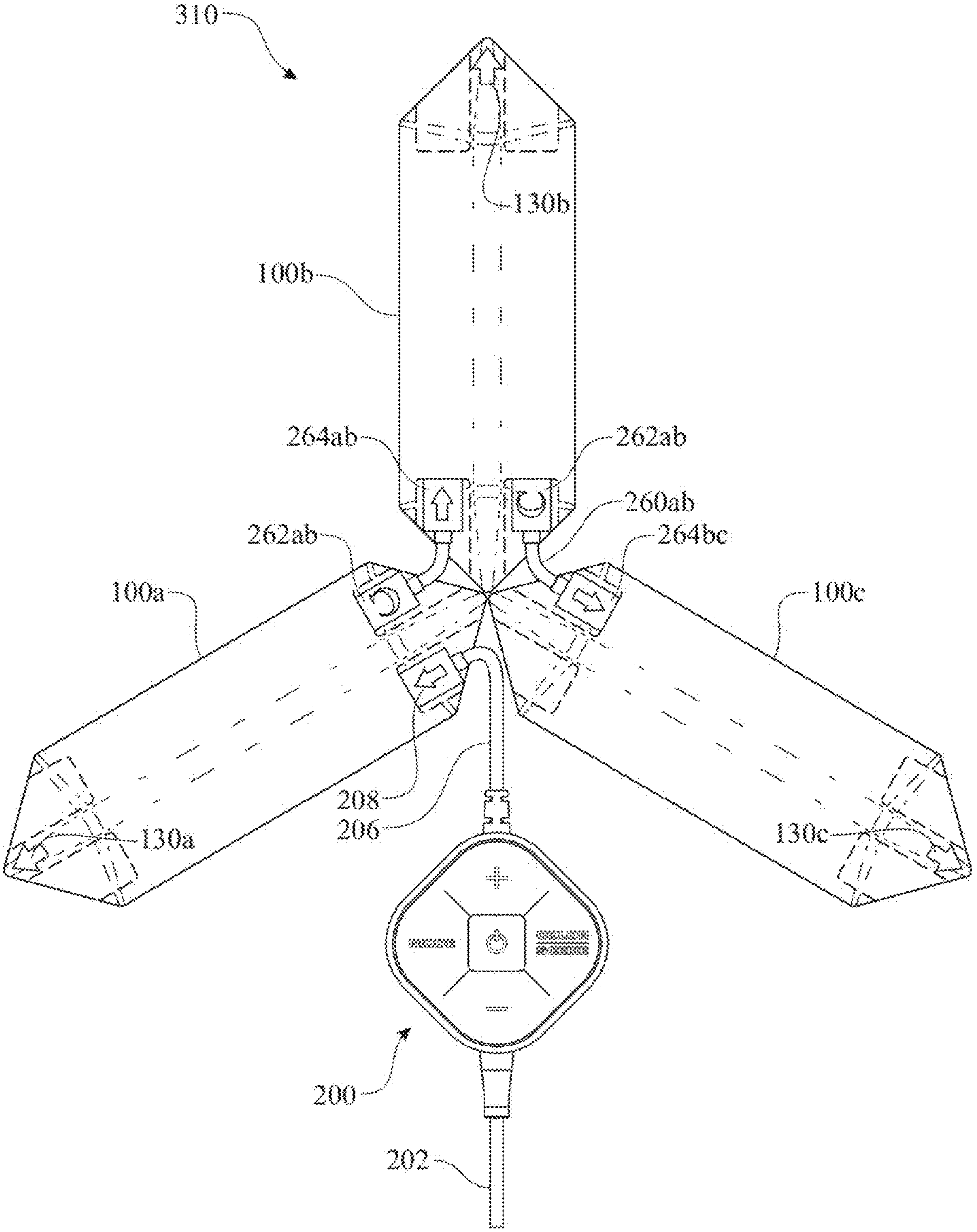
FIG. 21 presents a system of decorative elongated hexagonal light panels and controller illustrating a second interconnective configuration.
Figure 22:
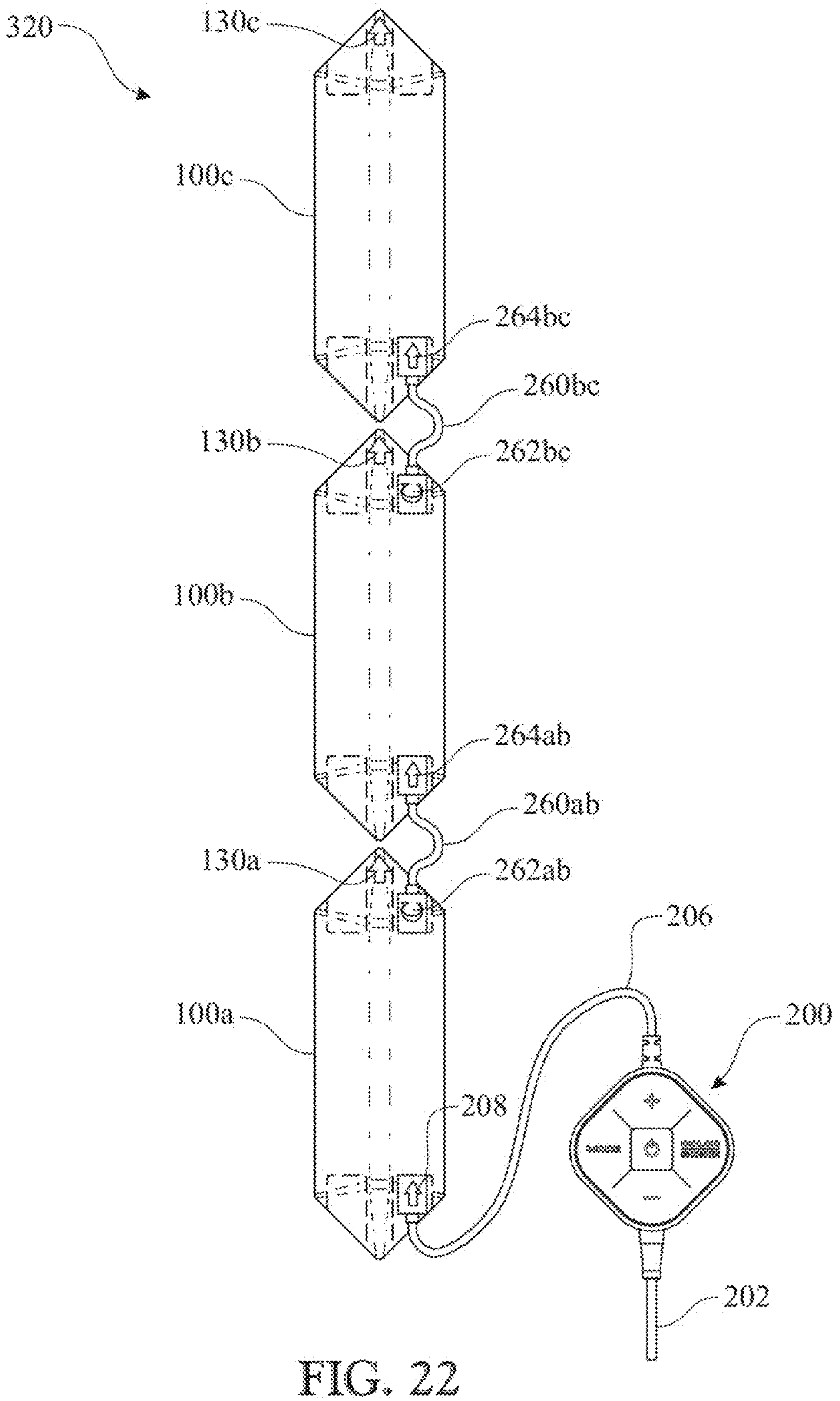
FIG. 22 presents the system of decorative elongated hexagonal light panels and controller with the light panels interconnected in series.
Figure 23:
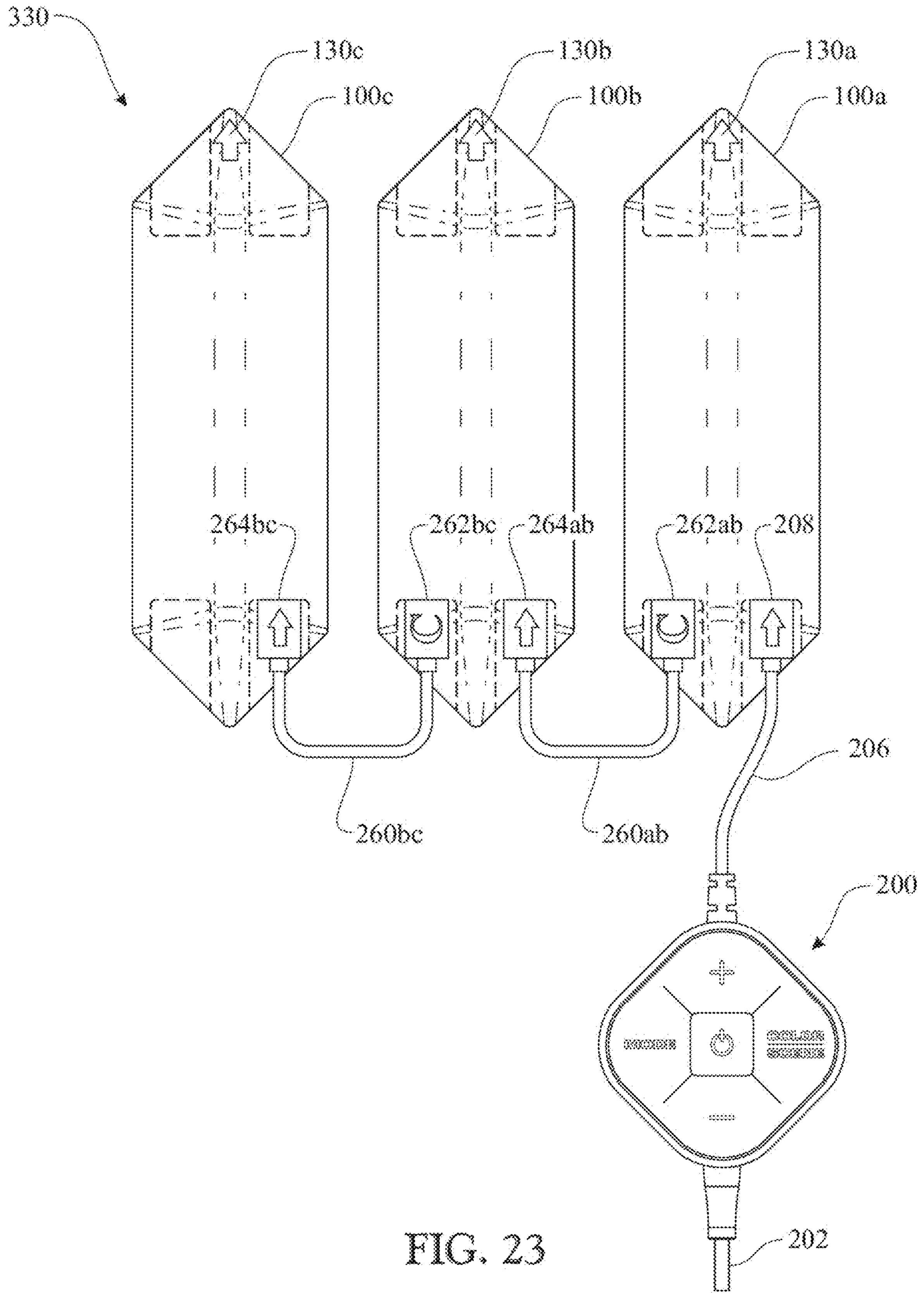
FIG. 23 presents the system of decorative elongated hexagonal light panels and controller with the light panels interconnected in parallel.
Figure 24:
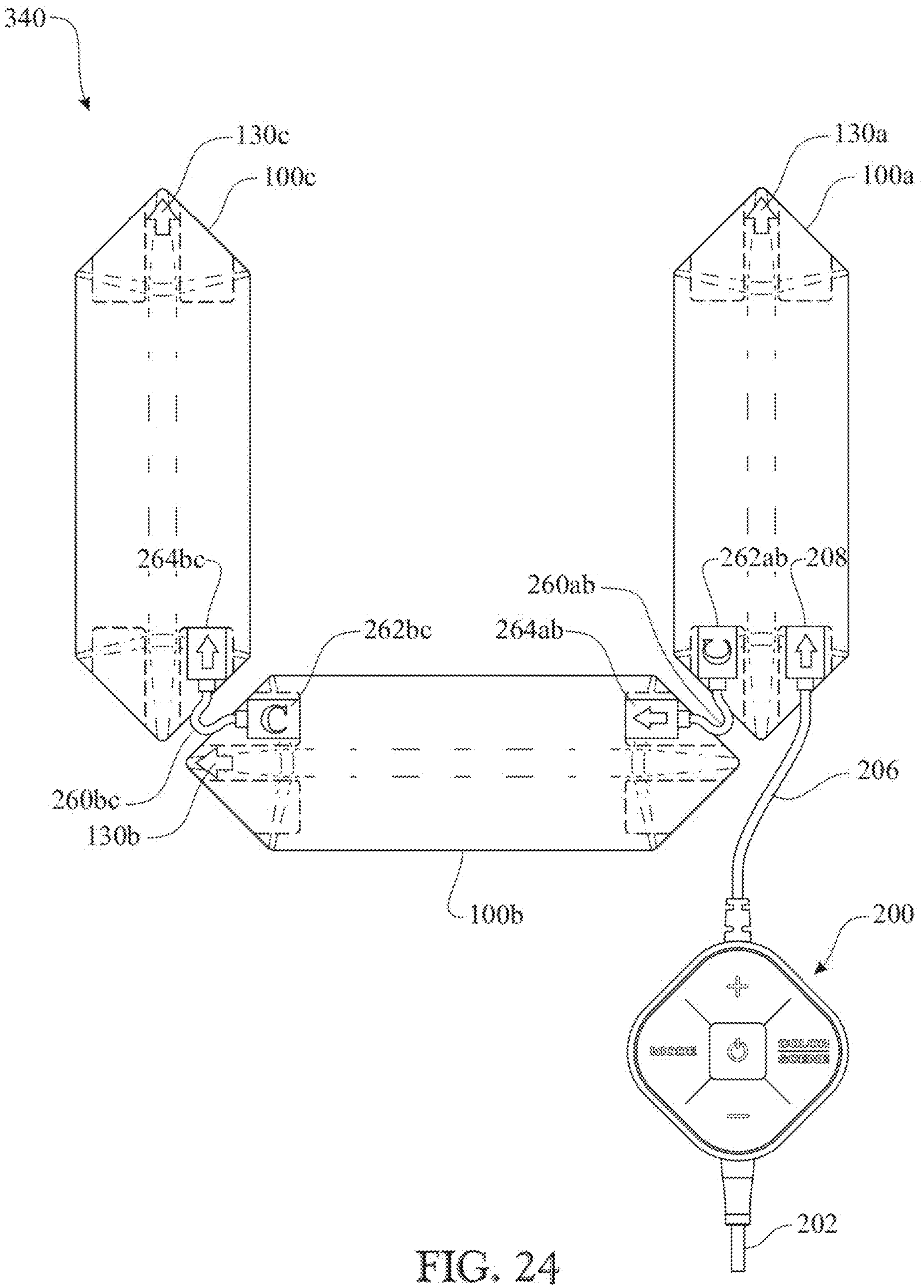
FIG. 24 presents the system of decorative elongated hexagonal light panels and controller with the light panels illustrating a first alternate connectivity in a "U" shaped arrangement.
Figure 25:
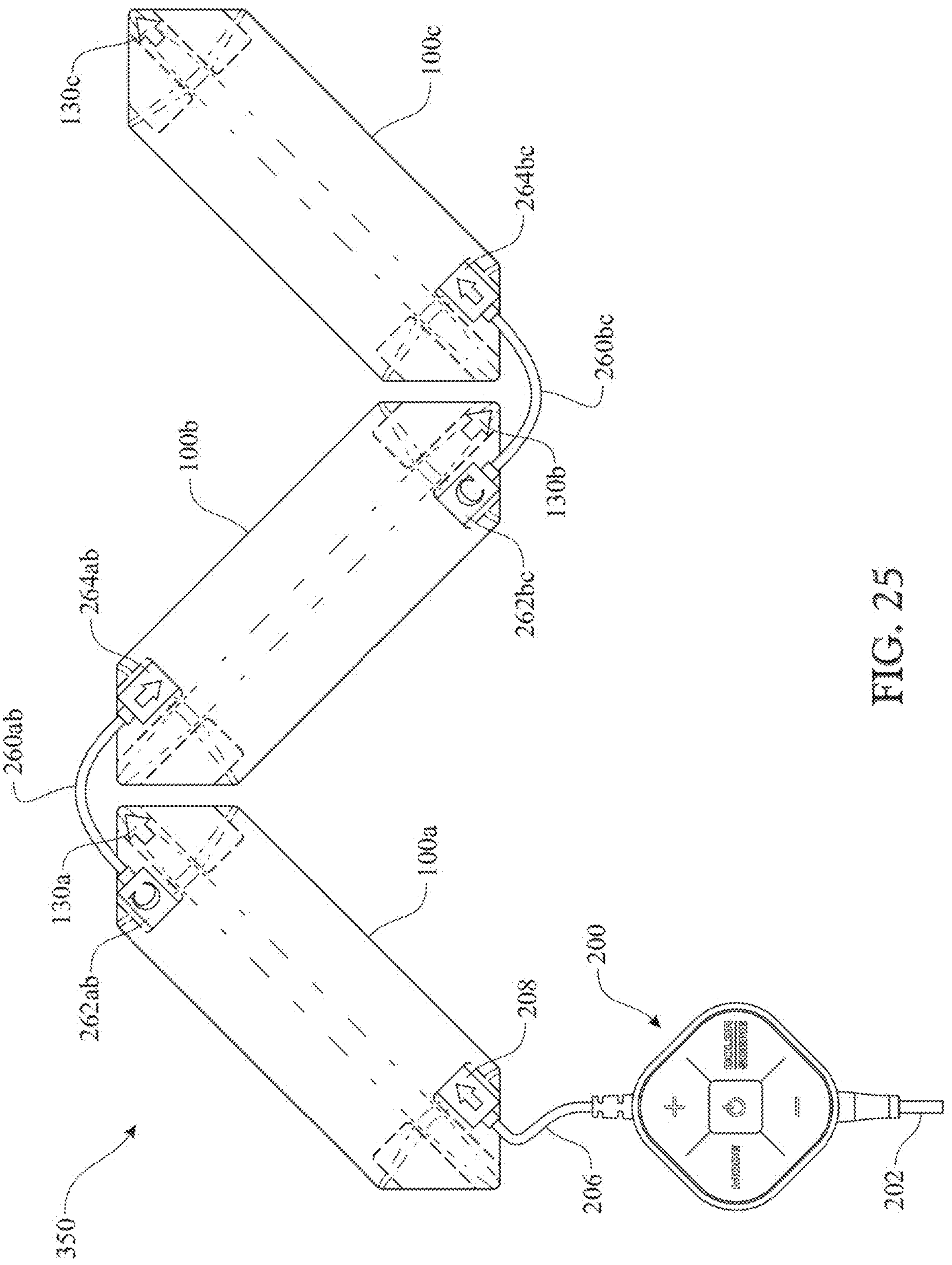
FIG. 25 presents the system of decorative elongated hexagonal light panels and controller with the light panels illustrating a second alternate connectivity in a "zig-zag" arrangement.
Figure 26:
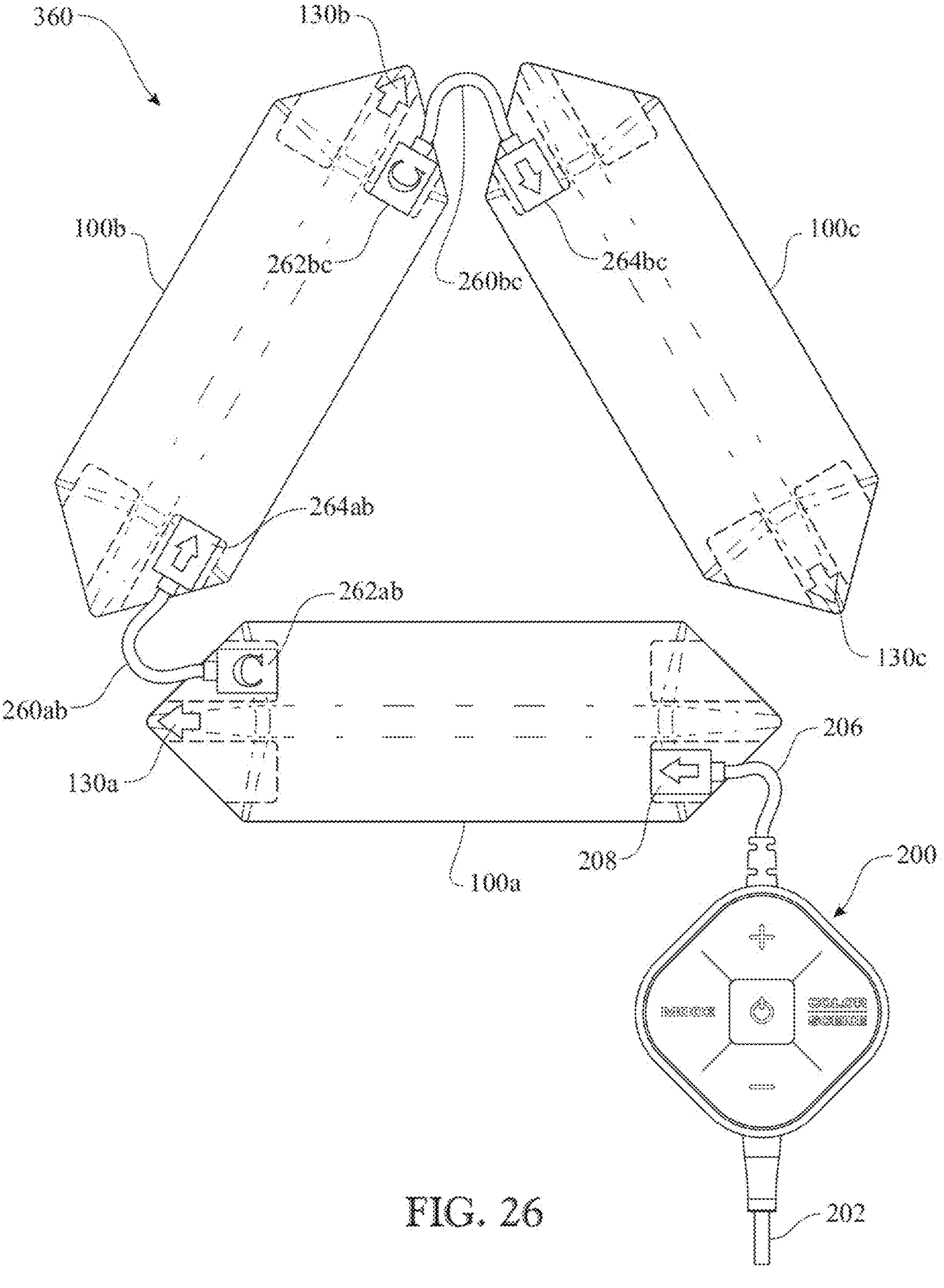
FIG. 26 presents the system of decorative elongated hexagonal light panels and controller with the light panels illustrating a third alternate connectivity in a "triangular" arrangement.
Figure 27:
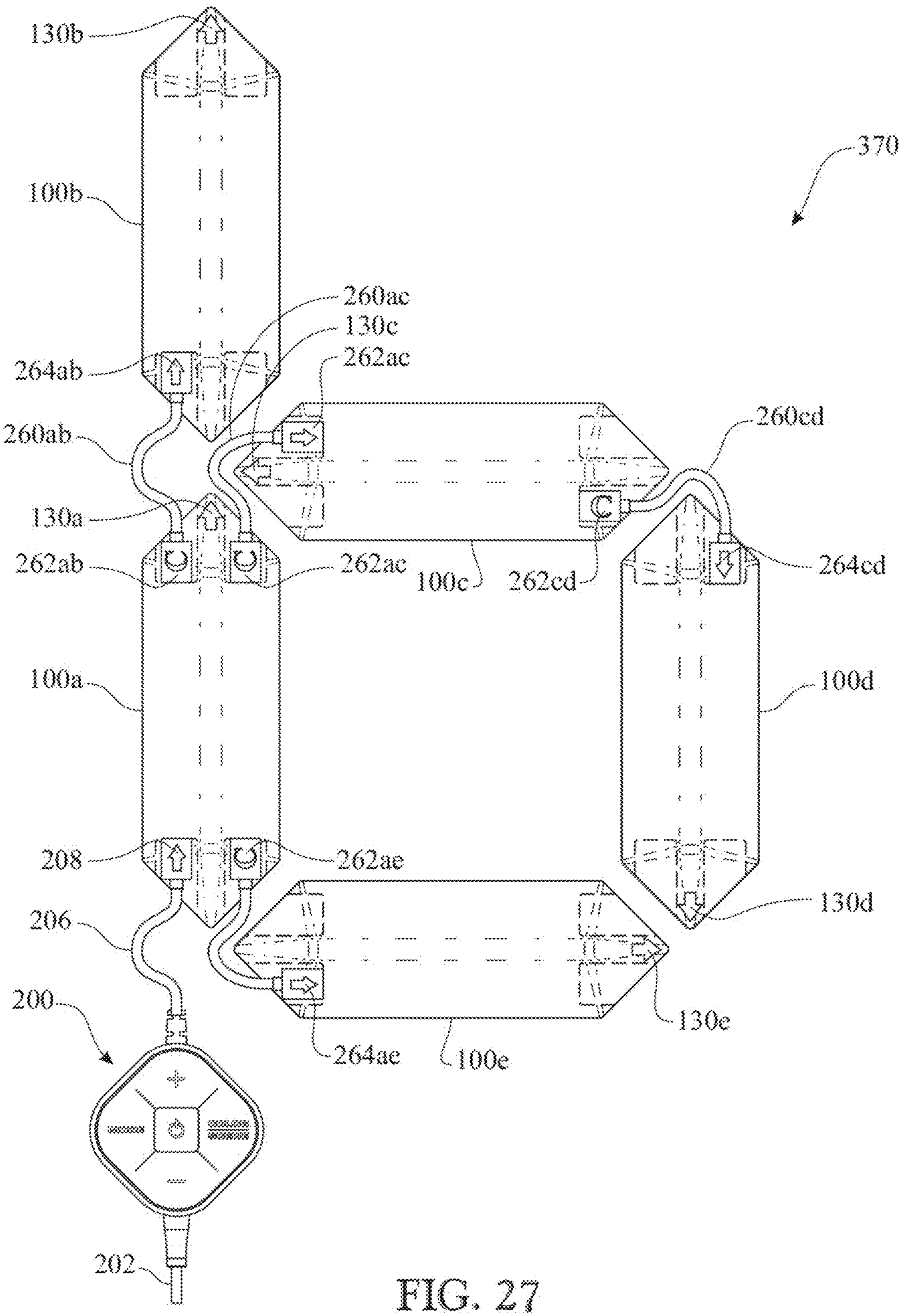
FIG. 27 presents the system of decorative elongated hexagonal light panels and controller with the light panels illustrating a fourth alternate connectivity in a "letter forming" arrangement, here illustrating the lower case letter "b"
Figure 28:
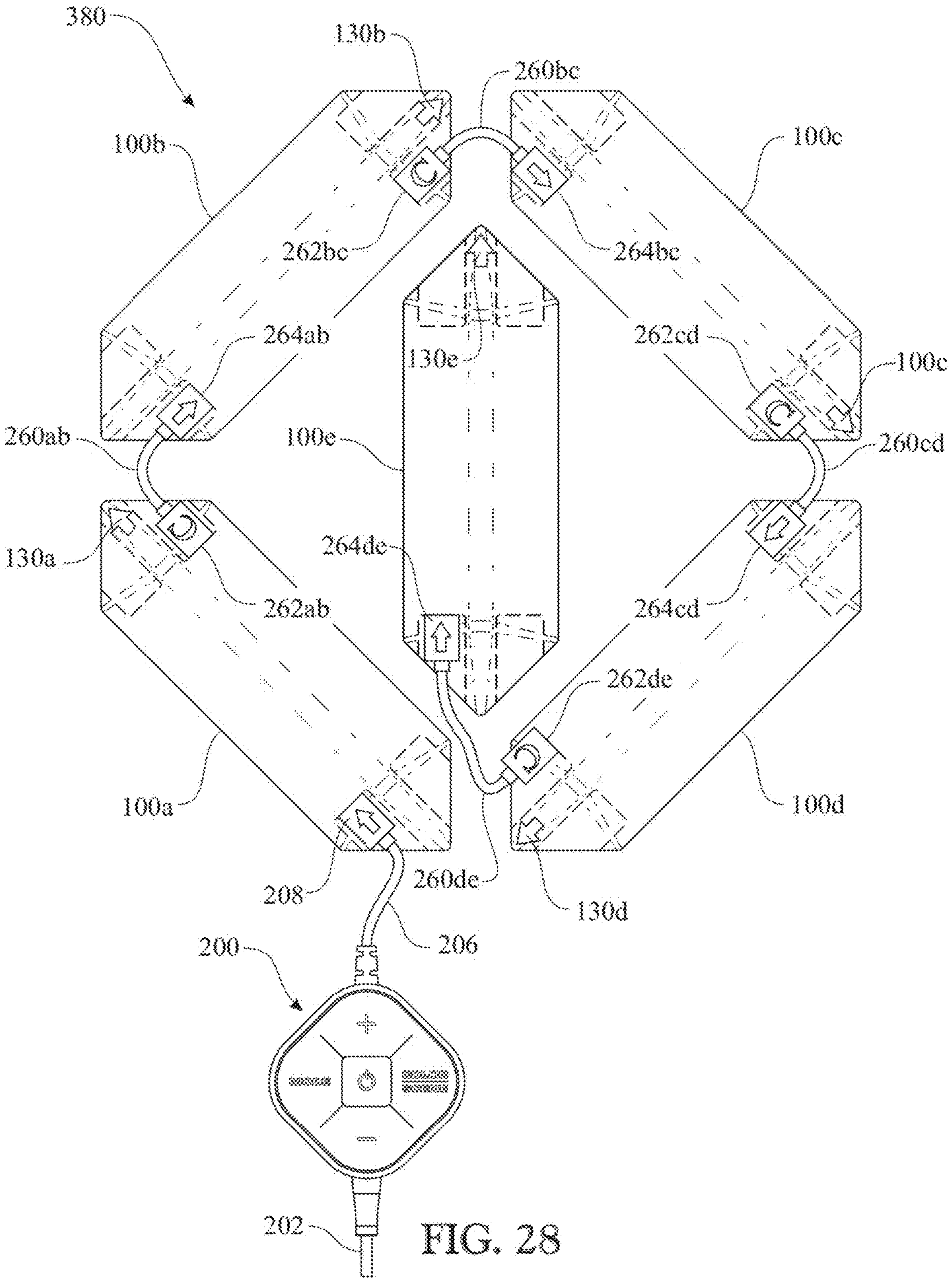
FIG. 28 presents the system of decorative elongated hexagonal light panels and controller with the light panels illustrating a fifth alternate connectivity in a square arrangement with an additional light panel within the square.
Figure 29:
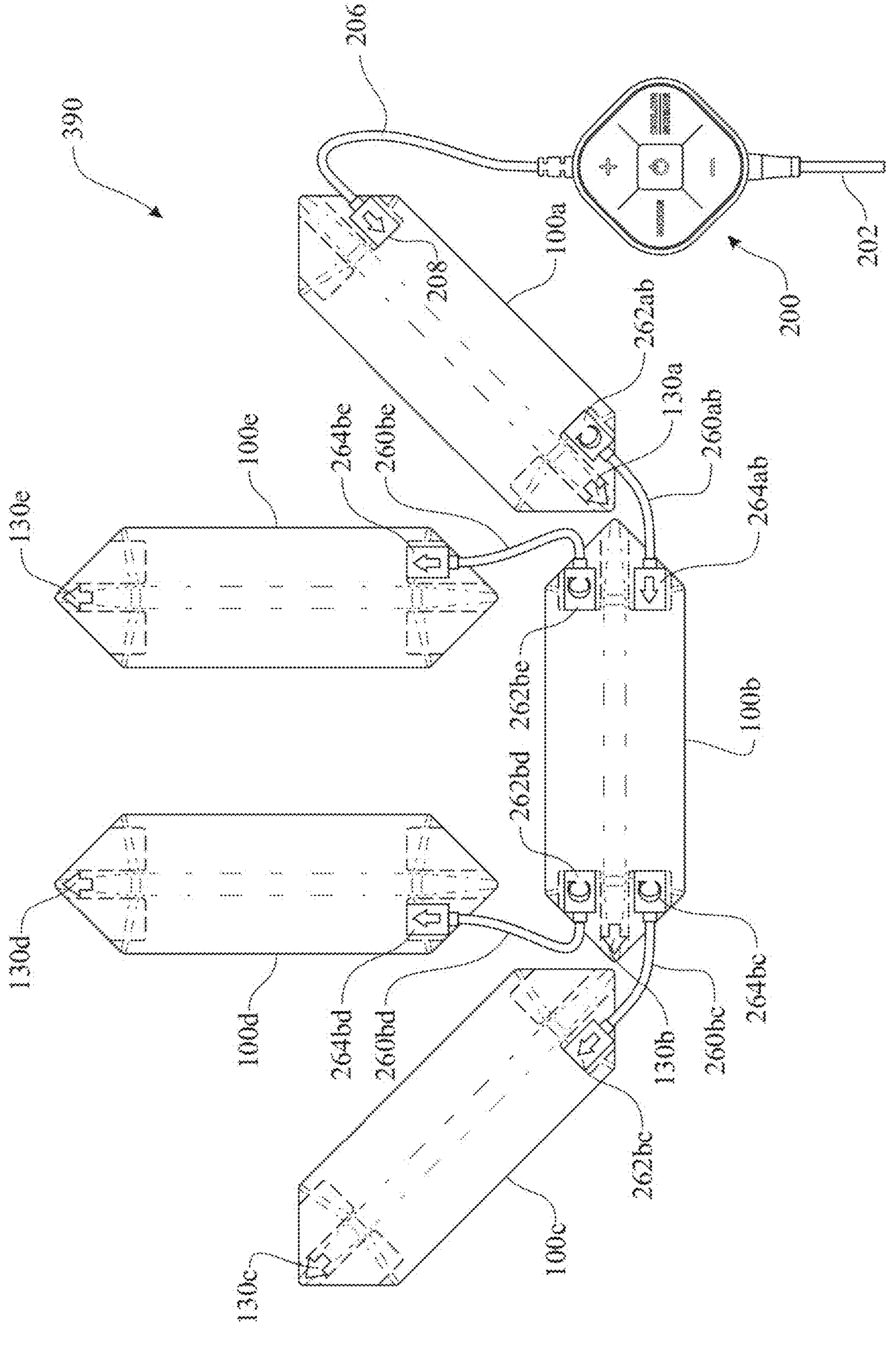
FIG. 29 presents the system of decorative elongated hexagonal light panels and controller with the light panels illustrating a sixth alternate connectivity in a "fan" arrangement with a plurality of light panels branching from a central light panel.
Figure 30:
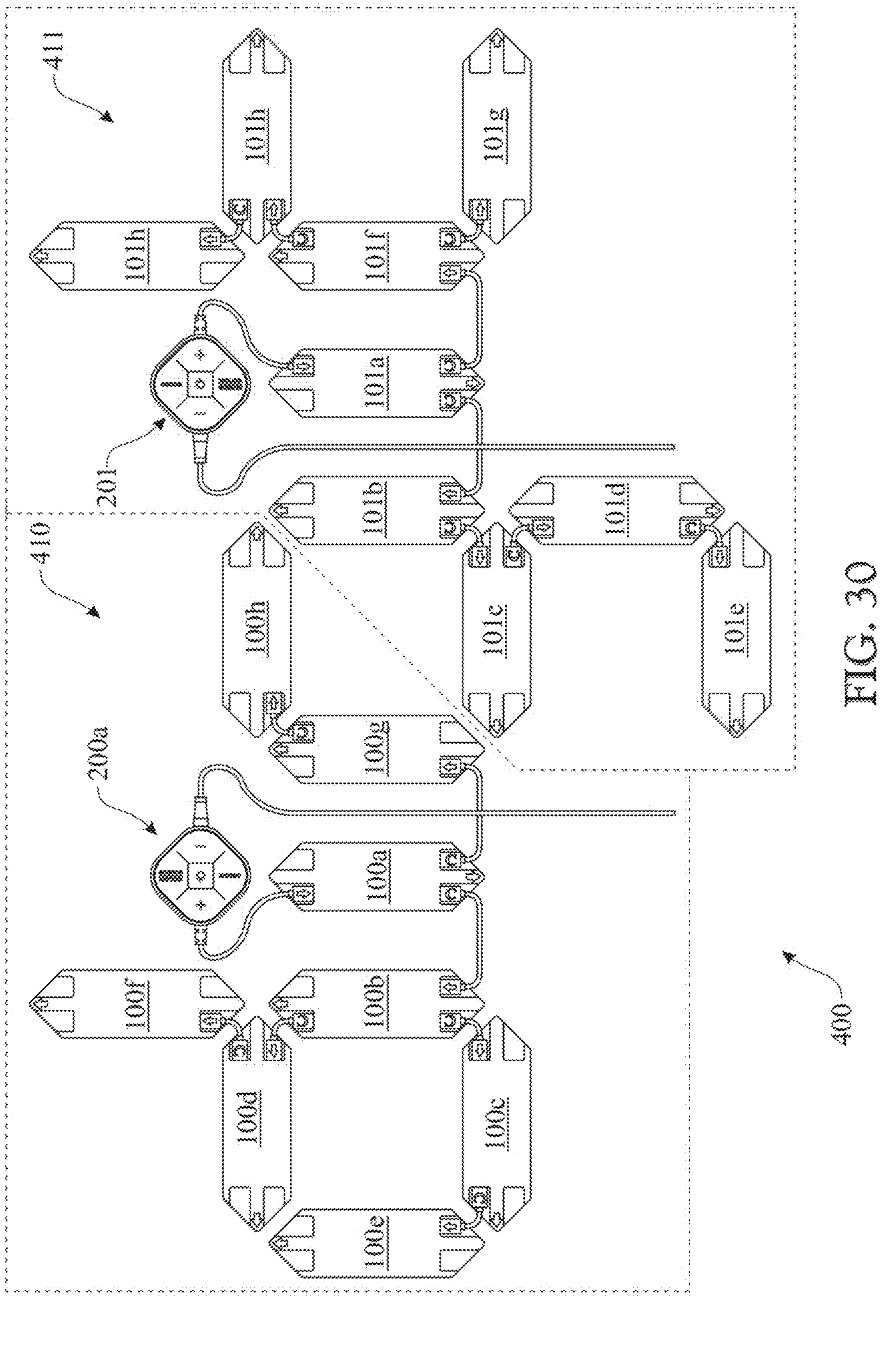
FIG. 30 presents the system of decorative elongated hexagonal light panels and controller with the light panels illustrating a seventh alternate connectivity incorporating two controllers and associated light panels forming the letters of the word "digit".

As illustrated in FIG. 20, the orientation arrows 130 of each light panel assembly 100*a*-100*c* are oriented to point to a central convergent point of the light panel assemblies 100*a*-100*c* to insure that the light patterns and flows of the light panel assemblies are consistent. As also illustrated in FIG. 21, the light panel assemblies 100*a*-100*c* can be reversed such that the orientation arrows 130 point away from the central convergent point of the light panel assemblies 100*a*-100*c* thereby creating a different visual light pattern while maintaining the same physical configuration and electrical connections as light panel assemblies 100*a*-100*c* in FIG. 20.

As illustrated in FIGS. 22-30, as exemplary but not limiting arrangements, the light panel assemblies 100 can be physically configured in many unique arrangements limited only by the number of light panel assemblies used. These examples illustrate the biased direction of the connector cables 260 and the proper arrangement of connector cables 260 and light panel assemblies 100 oriented according to the respective orientation arrows 130. These examples are self-explanatory in consideration of the above description of the various aspects of the embodiments and therefore are not described further herein. In one embodiment, each controller can service up to 10 light panel assemblies 100 connected thereto so long as each individual light panel assembly has only one connector cable 260 attached thereto functioning as an input of power and signal. One or more of the remaining three connector receptacles of the light panel assembly can then be connected to downstream light panel assemblies 100 with additional connector cables 260 wherein the three remaining connector receptacles function as outputs to the downstream light panel assemblies interconnected thereto.

As previously discussed, each individual light panel assembly includes on the bottom thereof an orientation arrow 130. One of the functional modes of the individual light panel assemblies is the lateral visible flow of an illumination pattern of color or series of colors from one end of a light panel assembly 100 to the opposite end thereof. The orientation arrow is indicative of such a flow since the controller will cause the light pattern of each individual light panel assembly to flow in the same direction with respect to the orientation arrow.

Additionally, because of the limitation to the number of light panel assemblies that can be connected to one controller, an application necessitating more than that number of light panel assemblies 100 such as the formation of a series of individual letters spelling a word can be accomplished by utilizing more than one controller 200, each with interconnected light panel assemblies 100. Each of the systems utilized in such an application would have its own controller. By pairing the controllers with a Wi-Fi system or directly to a portable device such as a smart phone the entire arrangement can be controlled concurrently rather than individually and thus appear to have a seamless operation.

The above description is considered that of certain embodiments of the present invention only. Modifications of the invention will occur to those skilled in the art and to those who make or use the invention. Therefore, it is understood that the embodiments described herein are merely for illustrative purposes only and are not intended to limit the scope of the invention hereof.

We claim:

1. An elongated hexagonal decorative light system comprising:

- a plurality of light panel assemblies, each light panel assembly further comprising:
  - a base having an elongate hexagonal shaped outer periphery, the base defining two connector apertures at each end of the elongate base in a bottom of the base;
  - a printed circuit assembly mounted to the base and having a plurality of light emitting diodes populated thereon and electronic circuitry for selectively illuminating the light emitting diodes;
  - a plurality of electrical receptacles, at least two receptacles positioned at each end of the printed circuit assembly, each electrical receptable in registration with one of the connector apertures defined in the base at each end of the elongate base; and
  - a prismatically shaped lens affixed to an upper surface of the base;
- a controller having a base receiving an electrical power cord, the power cord electrically connected to a printed circuit assembly mounted on the base wherein the printed circuit assembly includes the circuitry and logic for controlling the plurality of light panel assemblies, and the controller further terminating with an electrical connector connectively compatible with the electrical receptacles of the light panel assemblies; and
- a plurality of connectors, each connector having a multi-lead electrical plug receivable in the electrical receptacles in the light panel assemblies.

2. The elongated hexagonal decorative light system according to claim 1 wherein the electrical receptacles at each end of the light panel assemblies are aligned parallel to a long axis of the light panel assembly.

3. The elongated hexagonal decorative light system according to claim 1 wherein the base further includes a visible orientation arrow corresponding to the arrangement orientation of the light emitting diodes on the printed circuit assembly of the light panel assembly to aid in the orientation of one light panel assembly to another like light panel assembly.

4. The elongated hexagonal decorative light system according to claim 1 wherein the prismatically shaped lens is translucent.

5. The elongated hexagonal decorative light system according to claim 4 wherein the prismatically shaped lens has a raised center and faceted sides, each faceted side corresponding to a side of the light panel assembly.

6. The elongated hexagonal decorative light system according to claim 1 wherein the controller further includes a plurality of microswitches electrically interconnected therewith for manual control inputs.

7. The elongated hexagonal decorative light system according to claim 6 wherein the microswitches are covered with a flexible membrane having legends embossed thereon for identification of the function of each microswitch.

8. The elongated hexagonal decorative light system according to claim 1 wherein the controller further includes circuitry and logic to be remotely responsive to wireless electronic inputs from a remote electronic device for controlling the plurality of light panel assemblies.

9. The elongated hexagonal decorative light system according to claim 1 wherein each of the electrical plugs is directionally biased to permit flow of electrical signals in one direction only, at least one electrical plug bearing a visible legend identifying the directional bias of the connector.

10. The elongated hexagonal decorative light system according to claim 1 wherein the printed circuit assembly of the light panel assembly further includes circuitry and logic to illuminate the light emitting diodes thereon in a plurality of predetermined patterns and light motions.

11. The elongated hexagonal decorative light system according to claim 10 wherein the light panel assemblies of the system are identically responsive to electrical signals from the controller to display identical light patterns and motions concurrently.

12. The elongated hexagonal decorative light system according to claim 10 wherein the light panel assemblies of the system are responsive to electrical signals from the controller to display a progressive light pattern and motion across the plurality of the light panel assemblies.

13. The elongated hexagonal decorative light system according to claim 1 further including an octagonal mounting bracket, the mounting bracket having a magnet housed therein.

14. The elongated hexagonal decorative light system according to claim 13 wherein the light assembly base defines an octagonal aperture in a bottom surface thereof for receiving the octagonal mounting bracket.

15. The elongated hexagonal decorative light system according to claim 14 wherein the light assembly base further includes a magnetically sensitive plate mounted over the octagonal aperture in a manner that the magnetic force of the mounting bracket magnet retains the light panel assembly in a desired location and position, the light panel assembly being readily detachable and rotationally repositionable from the hexagonal mounting bracket by overcoming the magnetic force.

16. The elongated hexagonal decorative light system according to claim 1 wherein the connector cables are electrically bidirectional.

17. The elongated hexagonal decorative light system according to claim 16 wherein the printed circuit assembly of the light panel assembly further includes circuitry and logic to determine which of the receptacles at each end of the light panel assembly is functioning as an electrical input and automatically electrically configures the remaining receptacles as electrical outputs.

18. An elongated hexagonal decorative light system comprising:

a plurality of light panel assemblies, each light panel assembly further comprising:

a base having an elongate hexagonal shaped outer periphery, the base defining two connector apertures at each end of the elongate base in a bottom of the base;

a printed circuit assembly mounted to the base and having a plurality of light emitting diodes populated thereon and electronic circuitry for selectively illuminating the light emitting diodes and circuitry and logic to illuminate the light emitting diodes thereon in a plurality of predetermined patterns and light motions;

a plurality of electrical receptacles, at least two receptacles positioned at each end of the printed circuit assembly, each electrical receptacles in registration with one of the connector apertures defined in the base at each end of the elongate base; and a prismatically shaped translucent lens having a raised center and a facet corresponding with each side of the base and affixed to an upper surface of the base;

a controller having a base receiving an electrical power cord, the power cord electrically connected to a printed circuit assembly mounted on the base wherein the printed circuit assembly includes the circuitry and logic for controlling the plurality of light panel assemblies, a plurality of microswitches electrically interconnected therewith for manual control inputs, and further includes a signal and power cord extending therefrom and terminating with an electrical connector connectively compatible with the receptacles of the light panel assemblies;

an octagonal mounting bracket having a magnet embedded therein; and a plurality of connector cables, each connector cable having a multi-lead cable segment terminated at each end with an electrical plug receivable in the electrical receptacles in the light panel assemblies.

19. The elongated hexagonal decorative light system according to claim 18 wherein the light assembly base defines an octagonal aperture in a bottom surface thereof for receiving the octagonal mounting bracket.

20. The elongated hexagonal decorative light system according to claim 19 wherein the light assembly base further includes a magnetically sensitive plate mounted over the octagonal aperture in a manner that the magnetic force of the mounting bracket magnet retains the light panel assembly in a desired location and position, the light panel assembly being readily detachable and rotationally repositionable from the octagonal mounting bracket by overcoming the magnetic force.

* * * * *